US006772136B2

(12) United States Patent
Kant et al.

(10) Patent No.: US 6,772,136 B2
(45) Date of Patent: *Aug. 3, 2004

(54) SYSTEM AND METHOD FOR FINANCIAL INSTRUMENT MODELING AND USING MONTE CARLO SIMULATION

(76) Inventors: Elaine Kant, 5806 Mesa Dr., Suite 250, Austin, TX (US) 78731; Curt Randall, 5806 Mesa Dr., Suite 250, Austin, TX (US) 78731

( * ) Notice: Subject to any disclaimer, the term of this patent is extended or adjusted under 35 U.S.C. 154(b) by 598 days.

This patent is subject to a terminal disclaimer.

(21) Appl. No.: 09/754,833

(22) Filed: Jan. 3, 2001

(65) Prior Publication Data

US 2002/0010667 A1 Jan. 24, 2002

Related U.S. Application Data

(63) Continuation-in-part of application No. 08/915,985, filed on Aug. 21, 1997, now Pat. No. 6,173,276.

(51) Int. Cl.[7] ................................................. G06N 5/02
(52) U.S. Cl. ............................................ 706/50; 705/35
(58) Field of Search ....................... 706/50, 47; 705/35

(56) References Cited

U.S. PATENT DOCUMENTS

| | | |
|---|---|---|
| 5,029,119 A | 7/1991 | Konno |
| 5,129,035 A | 7/1992 | Saji et al. |
| 5,159,687 A | 10/1992 | Richburg |
| 5,408,638 A | 4/1995 | Sagawa et al. |
| 5,485,601 A | 1/1996 | Ching |
| 5,692,233 A | 11/1997 | Garman |
| 5,699,271 A | 12/1997 | Sagawa et al. |
| 5,699,310 A | 12/1997 | Garloff et al. |
| 5,815,717 A | 9/1998 | Stack |
| 5,920,717 A | 7/1999 | Noda |
| 5,940,810 A | 8/1999 | Traub et al. |
| 6,173,276 B1 * | 1/2001 | Kant et al. .................. 706/50 |
| 6,381,586 B1 * | 4/2002 | Glasserman et al. .......... 705/36 |

OTHER PUBLICATIONS

Charnes, J.M. "Using Simulation For Option Pricing". Proceedings of the 2000 Winter Simulation Conference, ed. J.A. Joines, R.R. Barton, K. Kang, and P.A.Fishwick, pp. 151–157.*

(List continued on next page.)

Primary Examiner—Wilbert L. Starks, Jr.
Assistant Examiner—Anh T. Nguyen
(74) Attorney, Agent, or Firm—Charles D. Huston; Conley Rose P.C.

(57) ABSTRACT

The software synthesis method and system of the present invention provides a problem solving environment for Monte Carlo simulations (or other concise mathematical description), common in engineering, finance, and science, which automatically transforms a problem description into executable software code. The method and system uses a specification language to support a user's natural description of the geometry and mathematics of the problem and solution strategies. The natural description is concisely expressed using general coordinates and dimensionless parameters, using domain specific keywords as appropriate. The user's problem description is compared with the system's knowledge base to refine the problem—i.e., identifying constraints, applying heuristics and defaults, and applying elaboration rules. The software synthesis method and system uses planning process, computer algebra, and templates to analyze and optimize the problem description, choose and customize data structures, and generate pseudo-code. The pseudo-code is translated into the desired target language source code. The software synthesis system and method therefore provides the ability to describe a problem and possible solution strategies at a high level, and outputs target language code that implements a solution. The software synthesis system and method is particularly useful modeling options where a Monte Carlo simulation is used.

20 Claims, 10 Drawing Sheets

OTHER PUBLICATIONS

Fu, M.C. "Pricing of Financial Derivatives Via Simulation", Proceedings of the 1995 Winter Simulation Conference, ed. C.Alexander, K.Kang, W.R. Lilegdon, and D. Goldsman, pp. 126–132.*

Chalasani, P, S.Jha, I. Saias, "Approximate Option Pricing". Institute of Electrical and Electronics Engineers 1996, pp. 244–253.*

"Interactive Selling Solutions," © 1999 Meridien Research, Inc., pp. 1–41.

Michael Sherris, The Valuation of Option Features in Retirement Benefits, Journal of Risk and Insurance, Symposium on Insurance Solvency and Finance 3–27, Sep. 1995.

Robert J. Myers, Incomplete Markets and Commodity–Linked Finance in Developing Countries, World Bank Research Observer 79–94, Jan. 1992.

Sergio Focardi, From Equilibrium to Non–Linear Dynamics in Investment Management, Journal of Portfolio Management 3–18, Jun. 1996.

Hayne E. Leland, Corporate Debt Value, Bond Covenants, and Optimal Capital Structure, Journal of Finance, 1213–52, Sep. 1994.

Thomas P. Boehm et al., Reverse Mortgages and Interest Rate Risk; Special Issue: Housing Finance for the Elderly, Journal of the American Real Estate & Urban Economics Association 9–24, Jun. 1994.

Raman Uppal, A General Equilibrium Model of International Portfolio Choice, Journal of Finance 529–53, Jun. 1993.

Lenos Trigeorgis, Real Options and Interactions with Financial Flexibility; Topics in Real Options and Applicatinos 3–21, Sep. 1993.

Curt Randall and Elaine Kant, "Automatic Synthesis of Financial Modeling Codes," Proceedings of the International Association of Financial Engineers First Annual Computational Finance Conference Stanford, Calif, Aug. 1996.

"Financial Toolbox for use with MATLAB—User's Guide—Version 2", The MathWorks, Inc., pp. 1–44–1–48, 1–82–1–86 and 2–35–2–42.

"The Mathworks Launches MATLAB into the Financial Marketplace with the Release of the Financial Toolbox", Business Wire, pp. 9181070. PROMPT [online] Retrieved from STN International. Accession No. 95:349255.

"Hattori Marshall Develops software for Swaps, Options (Hattori Marshall has Created Software . . . ", Nikkei Financial Daily, p. 1. Business and Industry [online]. Retrieved from Dialog Information Services. Accession No. 01006088.

Michael C. Fu, "Pricing of Financial Derivates Via Simulation", Proceedings of the 1995 Winter Simulation Conference pp. 126–132.

Elaine Kant, "Synthesis of Mathematical–Modeling Software", IEEE Software, vol. 10(3), pp 30–41.

Elaine Kant, "Knowledge–Based Support for Scientific Programming", IEEE, pp 2–4.

Robert Van Engelen. Gerard Cats and Lex Wolters, "Tomorrow's Weather Forecast: Automatic Code Generation for Atmospheric Modeling", IEEE Computational Science & Engineering, pp 22–31.

* cited by examiner

SYSTEM AND METHOD FOR FINANCIAL INSTRUMENT MODELING AND USING MONTE CARLO SIMULATION

The present application is a continuation-in-part of co-pending U.S. patent application Ser. No. 08/915,985 filed Aug. 21, 1997 U.S. Pat. No. 6,173,276. The entire text of each of the above-referenced disclosures is specifically incorporated by reference herein without disclaimer.

BACKGROUND OF THE INVENTION

1. Field of the Invention

The present invention relates to the automatic synthesis of executable software code from a user specification. A particular application is the automatic code generation for valuing financial instruments.

2. Description of Problem Environment

Mathematicians, physicists, engineers, and analysts who build computer programs to solve partial differential equation ("PDE") modeling problems must be familiar not only with the mathematics and physics of their problems, but also with a variety of technological tools. Pragmatically, this problem solving process involves thinking in terms of the tools, e.g., numerical software libraries, existing codes, and systems for connection software components. Unfortunately, sometimes the emphasis must shift too early from the fundamentals of the problem to how to code a solution.

Current practice generally centers around mathematical libraries that provide code modules to be connected via subroutine calls. Such libraries are limited to the specific interface required to use each module of the library.

The predominance of tool considerations can obscure the model and cause modelers to think at too low a level of abstraction. This can lead to compromises that cause inaccurate or incomplete solutions. Some difficulties are:

Insufficient understanding of the underlying mathematics may lead to a choice of numerical methods that are inappropriate to the problem, Higher-order methods tend to be avoided because they are too numerous to put into libraries and too tedious to code manually, Lack of generality or incompleteness in available libraries can cause modelers to include similar shortcomings in their own models, Unstated or poorly understood tool and component assumptions can lead to composition of software components in a way that violates their assumptions, The assembly of a solution from pre-existing components often precludes significant optimizations that span multiple components, and The assembly-of-components style of programming may also impose computing platform and language constraints not inherent in the modeling problem.

The shortcomings of conventional libraries have not escaped popular notice. To address some of the problems, both object-oriented libraries and expert systems have been proposed.

Object-oriented libraries can provide more generality by abstracting data structure representations, but they are usually not independent of the specific equations being solved or of properties such as spacial dimensionality and order of accuracy of the algorithm being used, which typically affects the data presentation. With any type of library, assembly and bottom-up optimization of individual modules is the user's focus rather than top-down decision making and global optimization.

Expert systems can select and combine library modules relieving the user of some of the programming burden. However, expert systems alone do not address issues such as an appropriate specification level, generation of arbitrary higher-order methods, global and problem-specific optimization, and platform re-targeting.

One feature common to the best of libraries and expert systems is a good analysis of the application area. Expert systems generally start at an abstract level in terms of problem solving goals or tasks and their subproblems. Eventually these tasks must connect into the specific functionality provided by the library routines. Object-oriented libraries allow this contact to be made at a more abstract level. As part of the analysis process, classifications or taxonomies of problems and solution techniques are typically developed. The analysis information may be used in the design of objects, decision or planning rules, or library routine naming schemes.

Many problems in science, engineering, or finance can be modeled using partial differential equations. While finite difference techniques are widely used for finding a solution for these PDE problems, producing accurate software code to generate a solution is difficult and time consuming. Programming such software code requires extensive domain knowledge of the problem, an understanding of the math, an understanding of advanced computer science techniques, and extensive testing and debugging. Therefore, other techniques are often used to model such problems.

For example, privately traded derivative financial products comprised a $29 Trillion industry in 1996, growing at 37% annually. Investment banks and derivative brokers make extensive use of sophisticated mathematical models to price the instruments, and once sold, to hedge the risk in their positions. The models used are basically of four types: analytical models, and three versions of approximate numerical models: Monte Carlo, lattices (binomial and trinomial trees) and finite differences.

A host of simplifications, e.g., constant interest rates, constant volatility of the underlying assets, continuously paid dividends, etc., allow analytic solutions to the Black-Scholes equation, the basic partial differential equation describing derivative securities. These analytic solutions are packaged in software libraries of "analytics". Many packages exist. They may be used by traders for rough estimates, but all the assumptions required to make analytic solutions possible, usually render them too inaccurate for pricing complex derivative products. Major investment banks usually strip them out of any integrated software systems they may buy, and substitute their own numerical models.

Monte Carlo models calculate the value of an option by simulating thousands or millions of possible random paths the underlying assets prices may take, and averaging the option value over this set. Early exercise features, i.e., American options, cannot be priced, and the values of critical hedging parameters are often noisy. Option parameters calculated in this way may converge to the correct answer quite slowly.

In lattice methods the price paths are again simulated as a discrete series of branch points, at which an asset price may go up, down, or perhaps remain unchanged. These methods are popular and quite flexible, but they require many branch points in time for accuracy, (They converge to the correct answer like 1/N, where N is the number of time samples.) and they may be very difficult to construct, especially in multiple dimensions. If the branches cannot be made to "reconnect" then the CPU time for these algorithms increases exponentially with N, rather than proportionately.

A solution based on finite difference solutions of the Black-Scholes partial differential equation and related equations is a desirable approach, but difficult to implement. Writing software solutions that solve such partial differential equations is time consuming and debugging difficult.

Another problem is that while it is widely assumed that current modeling techniques for financial processes are measured continuously, in the real financial world they are measured discretely. Often the difference is quite significant. The continuous measurement model may be too inaccurate to be useful. An example is the discrete sampling of an asset price, say at the end of a trading day, to determine if it has crossed a "barrier". Often option structure contain these barriers. An asset price crossing this barrier may "knock-out" an option, i.e., render it valueless. If a stock price crosses the barrier during the day but recrosses back before the end of trading, a continuous model of the option would be knocked out, but the discrete model would still be viable. There are similar differences between continuously and discretely sampled average and extremum prices which figure into Asian and lookback options.

There are, however, a number of problems where PDE solution methods are impractical. In such cases a methodology to generate a solution using Monte Carlo techniques is desirable. Examples of patents for valuing financial instruments include U.S. Pat. Nos. 5,940,810; 5,872,725; 5,819,237; 5,799,287; 5,790,442; 5,692,233 (incorporated by reference).

SUMMARY OF THE INVENTION

The problems outlined above are largely solved by the method and system of the present invention. That is, the present system provides the user with the ability to simply describe a problem, common in engineering, finance or science, and the system automatically transforms the problem into executable software code. The system and method hereof provide the ability to describe a problem and possible solution strategies at a high, abstract level, and the system uses its knowledge base to refine the problem in terms of finite difference solutions to partial differential equations (or other mathematical techniques, including Monte Carlo simulators). The system generates executable code that implements a solution.

Generally speaking, the method of the present invention automatically generates executable software code in a target language for a user defined problem. First, the method develops a problem specification for the user problem. Next, the method formulates a mathematical description of the problem specification, and finally, this method generates executable software code in the target language. The problem specification is developed using the user defined problem and comparing the user's input with the system's knowledge base. The system's knowledge base includes refinement rules, optimizing transformations, heuristics, constraints, and defaults to not only assist in developing the problem specification, but to identify inconsistencies or invalid definitions.

The mathematical description of the problem specification generates a coordinate free set of equations describing the problem specification. Additionally, the mathematical description produces a template particularly useful for solving the set of equations. Preferably, the templates include procedural control structures as well as data declarations. From the templates and equations, the method develops a data structure and generates pseudo-code describing the user problem. The pseudo-code is translated into source code in the target language, e.g. Fortran or C.

The knowledge base includes a number of templates arranged as hierarchy of classes. Such template classes might include solvers, time evolution algorithms, as well as stepping algorithms. Many methods are available for solving these equations, and in particular, a Monte Carlo simulation proves useful. Preferably, the method uses symbolic algebra with general coordinates and dimensional parameters to formulate the mathematical description of the problem specification.

The system of the present invention automatically generates executable software code based on the user defined specification. Broadly speaking, the system includes a knowledge base which contains constraints, heuristics, and defaults for developing a problem specification based on the user defined specification. The system additionally includes a computer algebra module for writing equations indicative of the problem specification. A class of templates are included in the system for specifying the boundary conditions and for describing the evolution of the equations. Preferably, the templates also generate the pseudo-code reflecting the specified algebra algorithms and equations. The system then generates source code in the specified target language and architecture.

The method of the present invention is particularly useful for valuing a financial option. Generally, the method for valuing a financial option begins with modeling the option with a partial differential equation and constructing a finite difference solution for the partial differential equation or a set of partial differential equations modeling Monte Carlo methods. In on embodiment Stochastic differential equations are "SDE" are specified to reflect the Monte Carlo simulation or converted to partial differential equations. The stochastic differential equations are discretized and pseudo-code is generated for the finite difference solution; pseudo-code is then transformed into the target language and compiled into executable code. A valuation of the financial option is computed using specified factors or parameters. This method of valuing a financial option is particularly useful for analyzing the effect of discrete events on valuation of the option. Such a discrete advent may comprise a valuation of the option if the asset price crosses a certain barrier price, or the number of days an asset price was below or above a certain barrier value.

DESCRIPTION OF ILLUSTRATIVE EMBODIMENTS

General Description

1.1 Introduction

Figure 1:
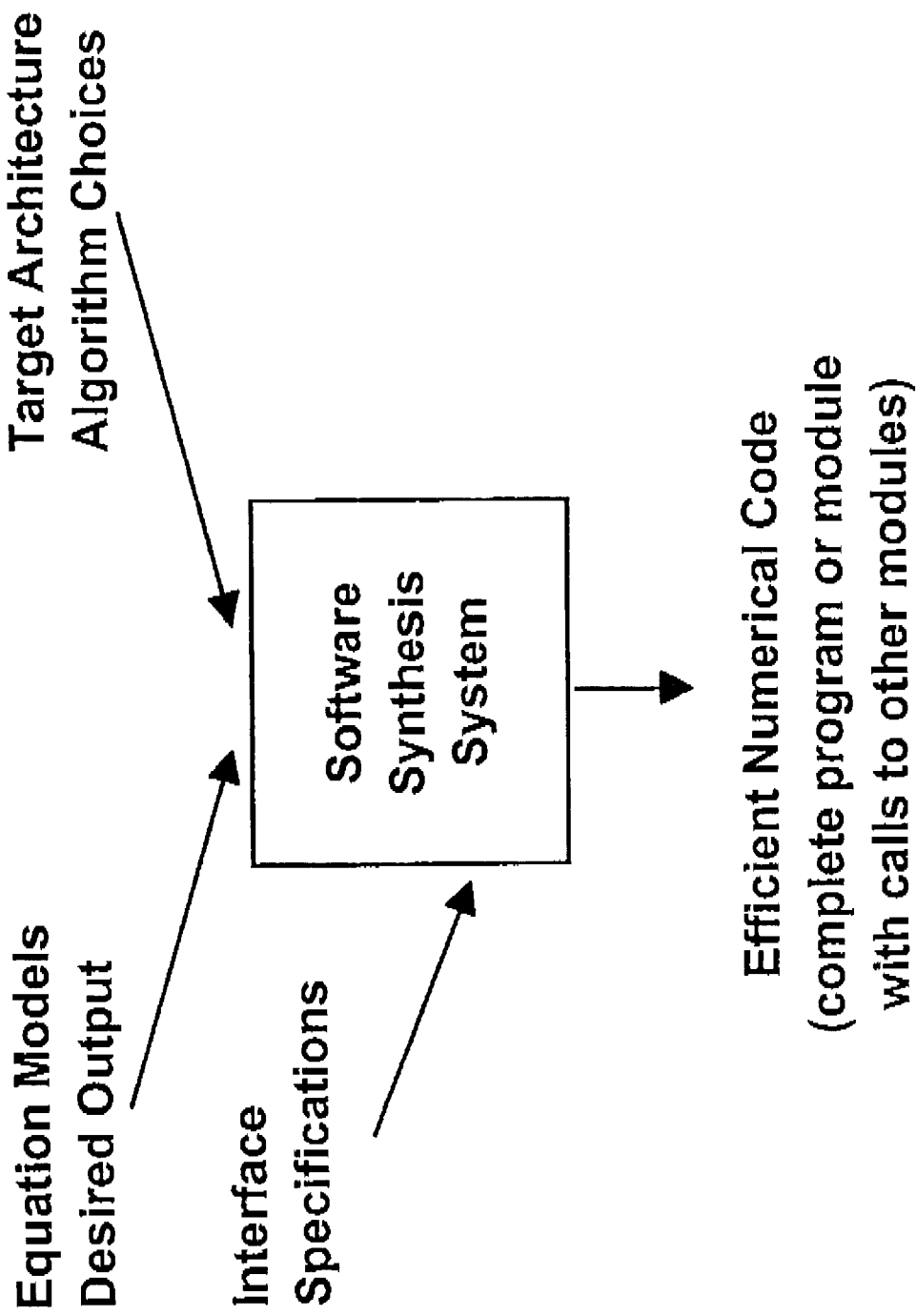
FIG. 1 is a block diagram depicting an overview of the software synthesis method and system of the present invention.

The method and system ("System") of the present invention is a problem solving environment ("PSE") for automatically transforming a mathematical modeling problem specification into an executable numerical program. The System's close integration with a computer algebra system confers more powerful code generation abilities than libraries or conventional expert systems. The System can be thought of as a very smart optimizing compiler, with optional directives, for a language consisting of mathematical and application specific terms. The System reads in a high-level specification describing a PDE modeling problem and the desired solution strategy, and outputs an executable numerical program that implements that solution (in a traditional programming language like Fortran or C). See FIGS. 1–3.

The main interface to the System is a problem specification language. This language allows an initial-boundary value problem for a system of partial differential equations ("PDE's") to be specified in terms of invariant differential operators or in a particular coordinate system. The region in which the differential equations hold is specified in terms of a rectangle in some coordinate system, which allows non-trivial regions to be discretized using logically-rectangular grids. The methods for discretizing the differential equations and the boundary conditions can be specified by giving keywords for common methods or by giving detailed mathematical replacement rules, or some combination of both. In the case of finite-difference discretations, specifying grid staggering and the placement of the boundaries in the staggered grid is simple and concise. The System applies computer algebra and program transformation rules to expand the equations in a particular coordinate system and expand and apply the discretization methods.

The System includes a template language for specifying algorithms. One typical use for templates is to specify the over-all time evaluation in terms of a general method for taking individual time steps. The particular method of evolution may be chosen from a library of templates (e.g., a movie or a convergence rate test), or a new template can be written. If the method is implicit, then a solver also may be chosen from a library of solver algorithms, e.g., preconditioned conjugate gradient or quasi-minimal residual, or a new solver template can be written. The System has heuristics for choosing solvers and for choosing many other features of the solution algorithm.

The way that the System constructs mathematical modeling software mimics good human style. But because the System is automated and includes a number of validation steps, good programming style is always followed, eliminating the types of problems that arise when people cut corners to save time and avoid tedium.

The System includes a knowledge-base implemented with objects, transformation rules, computer algebra, and a reasoning system. The knowledge-base of initial boundary value problems is extensive, and has been engineered to solve these problems intelligently. An abstract notion of the requirements for writing such programs is encoded in its objects, and the System fills in the details for a given specification based on rules associated with the objects. Information may be given to the System in files written by the user, from a simple terminal interface, or a graphical user interface. When the System realizes that it does not have a piece of information that it needs to specify a problem, it will ask the user for that information, typically by giving a menu of alternatives. Users can have the System use its own knowledge whenever possible or can request that they be asked to confirm the System's design choices. If some information has already been given to the System, then the reasoning system uses this to eliminate incorrect and implausible alternatives. Using constraints (hard and fast rules about legal options and combinations), heuristic rules of thumb for making decisions, and defaults, the system can take much of the burden of writing a program off the user.

Many applications in science, engineering, or finance can be modeled using partial differential equations. While finite difference techniques are useful for finding a solution for these PDE'S, generating accurate software code to generate such a solution is difficult and time consuming. Therefore, other techniques, such as analytical models, Monte Carlo, or lattice methods are often used to model such problems.

The entities that the System assembles are represented not by specific software components in subroutine or object libraries but as generic algorithm templates. These templates are human readable declarations of the essence of numerical algorithms, and are even easier to understand than typical pseudocode. In form, the templates are much like algorithm templates published in some numerical analysis books and used in some C++ libraries. However, rather than being simply suggestive about how to handle multiple dimensions and multiple variables, when combined with elaboration rules the templates are explicit and complete. The programming details of the algorithm are filled in as part of the synthesis process with whatever variation the problem demands. Typically the missing pieces include algebraic computations representing equation approximations, and data-structure representations based on the characteristics of these approximations. There also may be enumerations over sets of problem-specific indices based on properties the model.

The System assembles, elaborates, and optimizes a set of algorithm templates (very abstract, conceptual components). It can be viewed as a compiler for a very high-level, domain-specific language, but the language includes many domain-independent aspects. Also, standard compilation methods are only a small part of the implementation repertoire, which centers around a unification of object-oriented, rule-based, and planning techniques. Some simple variations on the architectural style of the target code, which is basically subroutine connection, can be specified and automatically synthesized. Beyond a required minimum problem description, users can specify as many or as few of the design decisions as they choose; the system itself has both the application-specific and computer science knowledge necessary to select, refine, and assemble its templates.

Although the scientific computing field has a long history of using library routines and layered component systems, there are some serious drawbacks to this approach of straight forward component combining. Proper selection and combination of mathematical software components requires not only an understanding of the type of computation and the interfaces and data structures of each component, but also of mathematical features such as matrix properties (e.g. symmetric, definite) and the accuracy of the approximations (typically relative to grid sizes). Some components, especially those designed for maximal efficiency, may require users to provide problem-dependent subroutines based on the specific equations to be solved. Thus, pitfalls in combining modules range from mistaken assumptions to human error to lack of global optimization. In current practice, combining codes from diverse applications can be difficult. For example when simulating electromagnetics and heat transfer for circuit design, the algorithms used by the component codes may contain conflicting assumptions, while various interaction terms that should be in the equations may be missing completely.

The System architecture discussed here organizes its conceptual component abstractions similarly to the organization of software libraries, but makes the mathematical constraints and assumptions explicit, is independent of the target language, and leaves out concrete details such as data structures. The synthesis system is therefore positioned to take advantage of existing library components when they are appropriately annotated, but it can more profitably generate components from its abstractions. Such components not only have checked assumptions, they also have automatically generated specializations and optimizations based on the problem specification. The nature of the application domain—scientific software is concisely specifiable yet quite variable and mathematically complex, but error-prone when written manually—makes the customized generation of components both possible and highly beneficial.

The System can be viewed as a domain specific software architecture whose components are generated as well as composed based on a series of design questions. The architecture consists of physics, mathematics, and numerical analysis knowledge added to a general-purpose, domain-independent, software synthesis system, all implemented on top of Mathematica. To empower applications experts to add their knowledge to the system, we want the required representations of domain-specific information to be as natural as possible. The use of domain-specific terms is one well-known consideration in such representations. This is facilitated by a customizable specification language. Another important consideration for our application is representing numerical analysis knowledge; the template representation addresses this need for abstract algorithmic description quite well. A final consideration is the representation of constraints on combining the templates or other conceptual entities. The System includes constraints, heuristics, and default rules for specifying how to make such design decisions.

1.2 Problem Specification 1.2.1 Geometry and Equation Specification

A problem specification can include keywords indicating the design choices to be made and detailed mathematical descriptions such as geometries and equations. The design choices may include choices of algorithms indicated by template names. The process is illustrated on problems that involve the solution of systems of partial differential equations.

The problem specification begins with a description of the spatial and temporal geometry, including a choice of a coordinate system. The physical space of the problem is described in terms of logically rectangular blocks, or regions. Each region has an interior and a boundary. The pieces of the boundary may themselves be decomposed for the description of the boundary conditions. The specification associates systems of partial differential equations ("PDE's") with each block of the physical space. The primary system of PDE's, sometimes known as the field equations, are those associated with the interior of a region. Boundary conditions are the equations associated with the region's boundary or the boundary's components. Initial conditions are equations defining the initial values for an evolution algorithm.

The problem specification of the System is composed as an outline whose framework is a description of the geometric region. Within this region outline there can be equations for each part of the region; there can also be output expressions and constraints. Common equations may be specified by name (e.g., Navier-Stokes), invoking an equation generator to produce one or more equations.

1.2.2 Discretization and Algorithm Specification

The region outline also provides a structure for expressing the desired discretizations and algorithms used to solve the problem. These may include the evolution algorithm that provides the main loop for the program, the time-stepping algorithm that tells how to take individual time-steps, the discretization methods to be used to discretize the PDEs, boundary conditions and initial conditions, any solver algorithms to be used on a system of equations, and the type of grid to be used in the discretization. By omitting any optional specifications, the user directs the System to use its methods, heuristics, and defaults to make the choices. The user may also override the System's basic defaults by providing alternative defaults.

Discretization recommendations can be made either as default methods or for application to particular systems of equations, equations, or terms in an equation. Many methods are known by name, and new ones can be easily defined in terms of the existing methods or completely new methods can be defined. Similarly, a specification can optionally indicate choices from the System's many algorithm templates, giving algorithms that are appropriate for any or all of the equations and applying different methods in different parts of the regions if desired. New algorithms can be defined in the high-level template language.

The System will make design and algorithm choices not specified, but will let users specify any choices, including from custom-defined discretizations and algorithms. Separation of concern in the System ensures that independent design decisions can be made independently; the System only forbids making mathematically or logically inappropriate choices. For instance, users may modify the grid specification without modifying the algorithm specifications.

1.2.3 Implementation and Interface Specifications

The System also accepts a wide range of algorithm and code design choices and interface specifications, including a target language (e.g., Fortran 77 or C) or an indication of how variables are initialized (values read interactively, read from files, hardwired in-line, computed from functions, etc.). Specifications might include what is to be output and in what format, and performance criteria such as the desired overall accuracy. As with all other design choices, the System has defaults if the user gives no direction.

1.2.4 Program Representation and Transformation to Code

Converting a specification from a mathematical description to a computer software code involves transforming partial differential equations from continuous to discrete form. If the partial differential equations are given in coordinate-free form, that is, in terms of the divergence, gradient, and curl, this equation must be refined into component equations using the physical coordinate system. Component equations are still continuous, so they must be transformed to discrete form, suitable for treatment on a computer. The user can specify equations at any level: coordinate free, component, or discrete, but to suppress unnecessary detail and allow for easy revisions and optimization, the equations and output expressions should be expressed at the highest possible level in a specification.

The discrete equations are suitable for treatment by numerical methods, e.g., evolution algorithms, solvers, and preconditioners.

The System includes a notion of levels that provides a framework for this refinement. The three highest levels are CoordinateFree, Component, and Discrete. The System transforms equations to the discrete equations automatically, thus eliminating errors that might be made with manual manipulations. The System analyzes the equations to determine what discretization methods to use, unless overridden by recommendations from the specification.

The notion of level carries all the way through the synthesis process, providing separation of concern and appropriate abstraction as each level is taken in sequence. The algorithm choices are made at the algorithm level. Next comes the DataStructure level, where the System selects generic data representations appropriate to the equations and algorithms. The System normally makes these choices without the user's involvement. Generic programming choices are made at the Program level. Pseudocode in a generic programming language is constructed, and its control structure is optimized at the Code level. Only at the end of the process is target-language code constructed, so it is easy to generate code in C, C++, Fortran 77, or Fortran 90 or any other appropriate language.

A unique feature of the System's method of controlling the transformation process is a unification of objects and rules that automatically generates a problem-solving plan from declarative descriptions of the rule dependencies. In contrast, pure object-oriented systems have to have extra support code to control the invocation of object methods or the combining of algorithm objects and data structure objects. Pure rule systems require the triggers to be included in rules. In the System, templates and mathematical entities are represented by objects, and methods for refining, elaborating, and optimizing are represented by methods associated with the objects. Heuristics for deciding which methods to apply are also associated with the objects. In the System, the method of control can therefore be automatically computed by inspecting the dependencies between objects, rules and heuristics, and by setting goals to instantiate and refine objects. The agenda mechanism then schedules refinements and design questions for making selections such as algorithms and data structures. The System uses the dependencies between attributes, as determined from the method descriptions to automatically determine an ordering of refinements that ensures that all design questions will be answered, and that all data to answer a design question will be in place before the question is raised. Object and rule checking tools ensure that there are no circularities in the dependencies among object attributes needed to make refinements or design decisions.

The component generation system is implemented in a general-purpose knowledge-based problem-solving system that we wrote on top of Mathematica. It is an integrated object system, rule system, and planning system that supports a mixed decision-making style. Users can make any design decisions they care about (e.g., selecting an approximation method or numerical algorithm), but are not be required to make any decisions for which they have no preferences or those that should be obvious to the system; the system will make these decisions with its constraints and heuristics.

Layered on top of the knowledge-based system is a program synthesis system, including the rules for language-independent analysis and optimization as well as specific target language code generators.

Class objects represent both mathematical constructs (e.g., a geometric region, system of equations, individual equation, or problem variable) and programming constructs (e.g., a subroutine or an indexing variable). Facets of the attributes store elaboration methods and rules about answering design questions (see next section). Part of the domain-specific knowledge base is recorded as template object classes. These are produced by translating the declarative specifications of algorithm templates.

During refinement, the system creates object instances that record the problem as described in the specification, the design decisions made, and facts about the elaborations of the specification objects into successive levels of refinement. For example, an equation object stemming from the problem specification is elaborated by attributes representing the formula after coordinate system processing, after discrete approximation, and after transformation into a pseudocode fragment. A pseudo code fragment corresponding to an equation would be an assignment statement in an explicit method but an algebraic computation that sets up the appropriate portion of an array in an implicit method. The facts recorded in the attributes also include relationships between objects (such as an equation and its variables, a variable and its initialization). Users may inspect object instances to examine intermediate results such as the equation's discretization formula.

The system's knowledge also includes several types of rules that make design decisions, elaborate object instances within one level, refine them to more concrete levels, and transform pseudocode. These rules are implemented in a stylized and augmented subset of Mathematica. Towards the end of the refinement process, the component contents are represented in an internal numerical programming language that is generated by collecting code fragments from instantiated templates and equation pseudocode statements. Rules optimize and transform the internal representation into commonly used languages such as Fortran or C.

Design questions not only involve selecting among alternative algorithms (components to piece together), but also among interface and assembly alternatives such as the method variable initialization (e.g., reading from a file, entering interactively, computing from a subroutine, etc.), or format for a file, or data structure representation (e.g., an array can be full, diagonal, time-independent, stencil, etc.)—these help interface the generated code to the outside environment. Many lower level design questions can be answered based on internal knowledge. For example, the "Type" attribute on a "Variable" can have as a value one of the alternatives Integer, Single, Double, String, Boolean, etc. Typically the system will optimize programs without instructions or advice from the specification.

Design questions are represented as attributes on objects. Associated with each design question (stored in facets on the class object) can be a set of alternative answers constraint rules, heuristic rules, and defaults. The alternative description is actually a characterization of the type of answer required, often subtypes or instances of the type facet associated with the attribute for the design question. Constraints impose definite requirements on the legal values of the alternatives; they can be based on previous design decisions or the nature of the mathematical problem. For example, some preconditioner alternatives can be ruled out because of the solver selection or matrix property. Constraints cannot be ignored because violated constraints will lead to incorrect codes. Heuristics are system suggestions and can be overridden by the specification. Defaults specify what to do in the absence of decisions made by the heuristics or the specification file.

The language for representing the rules and constraints is a fairly conventional boolean notation. The system essentially does forward chaining with the ordering determined by analysis of rule dependencies. We expect to do more work to make these rules even more declarative and easier to specify.

The System's planning system sets goals to instantiate objects and then refine them by filling in attributes. This includes an agenda mechanism that schedules refinements and design questions (discussed above) for making selections such as algorithms and data structures. The planning system uses the dependencies between attributes.

1.3 The General Purpose Knowledge-based System

The System includes a general-purpose knowledge-based system, written in Mathematica (see, S. Wolfram, *Mathematica: A System for Doing Mathematics by Computer*, 2nd ed., Addison-Wesley, Reading, Mass. 1991) (incorporated by reference for background). The System includes an integrated object system, rule system, and planning system. The knowledge-base permits a mixed decision style in which the System can make any design decisions not specified by the user, e.g., the System will make any discretization or algorithm choices left unspecified. The algorithmic information is stored as transformation rules or in extensible libraries in the form of templates. The System contains its own internal numerical programming language which is easily translated to the commonly used languages such as Fortran or C.

1.3.1 Representation Via Objects and Rules

The System objects explicitly represent common mathematical constructs such as a geometric region, region part, or boundary part, and a system of equations, individual equation, term, or problem variable. Objects also represent programming constructs such as a linear solver, a subroutine, a program variable, and so on. Objects carry explanatory help information, attributes describing methods for elaborating the object and its properties, and attributes describing associated design decisions.

Refinement rules detail the methods referred to in the object attributes. See, e.g., FIG. 2. Rules may expand keywords and abstract constructs, fill out discretizations, check specifications for internal consistency of physical units and tensor order, and so on.

The System creates instances of objects during the refinement process that persist throughout the entire synthesis. Some attributes on object instances record relationships between objects, such as linking an equation to all the variables it uses and linking a variable to all its equations. Users may inspect object instances to examine intermediate results such as an equation's discretization.

1.3.2 Explicitly Represented Design Choices

The System's knowledge base explicitly represents design choices to be made by the user or the System. Considering only the world of initial boundary value problems, hundreds of design choices exist, leading to tens of thousands of possible programs. To maximize flexibility, the System wants users to be able to specify any design choices they desire, but not be required to specify those for which they have no preferences or those that should be obvious to the System. These are typical intelligent agent or knowledge-based system goals. However, this implementation is not retrofitted to a pre-existing set of library routines. Many choices do involve decisions among algorithms, but the algorithms are represented as highly abstract templates. Other choices beyond the typical knowledge-based system involve the method of input (e.g., reading from a file, entering interactively, computing from a subroutine, etc.), or format for a file, or choice of data structure (e.g., an array can be full, diagonal, time-independent, stencil, etc.)—these help interface the generated code to the rest of the PSE. Typically the System will optimize programs without advice from the specification.

To make design choices easier for users to find and understand and easier for developers to extend, design choices are represented by attributes on objects. For example, the "Type" attribute on a Variable can have value Integer, Single, or Double, and the "Discretization-Method" attribute on an equation, system, or term can have values such as "CrankNicholson" or "CentralDifference[4]" (the "4" indicates fourth order). If a design choice is identified by a unique keyword, simply mentioning that keyword in the appropriate "When [region, . . . ]" context is sufficient.

Associated with each choice can be constraint rules, heuristic rules, and defaults. Constraints are definite requirements on the legal values of the alternatives; they can be based on previous choices or the nature of the mathematical problem. For example, some preconditioner choices can be ruled out because of solver choices and matrix properties. Constraints cannot be ignored because violated constraints will lead to incorrect codes. Heuristics are system suggestions and can be overridden by the specification. Defaults specify what to do in the absence of decisions made by the heuristics or the specification file.

1.3.3 The Planning Module

The System includes a planning module which sets goals to instantiate objects and then refine them by filling in attributes. This includes an agenda mechanism that schedules refinements and design decisions for making sections such as algorithms and data structures. The planning module uses the method descriptions to automatically determine an ordering refinements that ensures that all data to make choices is in place before a decision is considered.

By adding more knowledge to the System, the planning module can be used in several new ways. For example, it can derive and/or select equations or variants of equations based on problem properties, set up default parameters, or analyze data resulting from running the programs.

1.3.4 Context-dependent Code Optimization for the Generation of Multiple Target Languages and Architectures The System's internal representation of numerical programs is target-language independent and records the maximum parallelism possible in algorithms and equation. In the abstract setting, context-dependent global optimizations are easy and productive. These include early elimination of problem variables not needed to compute the desired outputs, and selection of optimal data structures, such as arrays based on problem-specific stencil sizes. The System also applies standard optimizations such as introducing temporary variables, loop merging and loop unrolling, and algebraic simplification.

Although the internal representation is language independent, the last step of optimization before code generation does provide for target-language specific optimizations. Currently, the System generates codes in C and Fortran-77, so for example, loop enumerations are reversed for C and Fortran arrays, and dynamic allocation is made available in C (and will be in Fortran-90).

Because the parallelism inherent in a problem solution is retained until the very last step of code synthesis, adding architecture-specific code generators is reasonably straightforward, as was done to generate Connection Machine Fortran (similar to Fortran-90). Here, no loop enumerations will be generated for array operations. Of course, the System could be extended for generating codes for distributed architectures using languages like MPI in the future. If any directives or particular code arrangements are necessary to interface with tools that take on tasks such as load balancing, these rules can be included in the synthesis system's package for architecture and system-specific code generation.

1.3.5 Extensive Use of Computer Algebra

The availability of computer algebra (e.g. Mathematica) makes it easy for the System to estimate truncation errors, compute derived quantities (such as sensitivities), transform equations into general coordinates, and discretize terms with arbitrarily high-order differencing formulas. Computer algebra capabilities allow the System to represent equations and templates independently from the problem dimensionality and coordinate system, yet still generate efficient code from high-level specifications. Computer algebra also helps globally optimize the target code, such as by determining stencils from discretized equations and by using the knowledge about stencil shape to optimize array representations.

1.3.6 Customization

To extensively augment the knowledge in a PSE, it must be easy to customize for different target languages and for different application areas. The System allows any chunk of specification language to be put in a separate file and be called by name. A typical use for this "macro" construct is to specify frequently used systems of equations with "equation generators." Additional customization can be accomplished with conditional specification keywords. For example, a keyword parameter to the Navier-Stokes equation generator can control whether to include an internal or a total energy conservation equation.

Macro files invocations can include keywords and also rules that replace any symbol with another symbol, constant value, or expression. Such rules can change variable names, set variable values, substitute expressions, or even pass in a set of problem-specific equations such as the state equations in a compressible hydrodynamics problem.

Users and developers of the System can customize algorithms, discretization methods, and decision rules. The template language (described herein) enables the definition of algorithms specific to an application area. Language constructs exist to name collections of Discretization methods and to define new Discretization methods by combining existing methods or by writing new continuous-to-discrete pattern replacement rules. It is also possible to add new constraints and heuristics on design choices, although these constructs need more work to be easily understandable to end users.

Using the preceding constructs, developers can define all the common names of equations, boundary conditions, derivatives and sensitivity terms, outputs, solvers, or any other design choice defined by the specification language. Application users can then write specifications completely in terms of those keywords, yielding very concise specifications that are easy for practitioners in that application area to understand.

1.3.7 Information System

To minimize the information-correctness problem, the System maximizes the recording of information in machine manipulatable form. The information is kept as a network of small chunks with well-defined relationships. A node of the network is represented by an object instance or attribute or a specification file. The relationships among nodes are: definition/short description, examples, syntax, longer narrative description, related node, alternative node.

Although the semantics of relationships could be refined arbitrarily, this set seems right, enabling us to make adequate distinctions without being overly burdening. The first four categories are just manually entered text. A related node is another node in the information network, either asserted manually by developers or automatically added when a node reference appears in a text field. An alternative node is a taxonomic sibling that is automatically computed from the taxonomy. These are typically alternative specification statements, alternative solvers, and alternative templates.

The specification files have associated nodes to provide access to examples. Examples are an important form of documentation showing exactly how to do something with a system. They also can be input for "cutting and pasting" experiments by users. The set of example files included in the information network is controlled by the directories and their contents at the time the network is built. The System supports annotations in the example specification files that provide values for the same set of relationships as the other nodes.

To make sure the network is consistent, the System performs checks to ensure that all nodes have a value for the Definition relationship, that all references are to existing nodes, and that all nodes are referenced by at least one other node.

The System assembles this information network in various ways. In Mathematica Help notebooks, the references between nodes, including example file nodes, are turned into hyper-links, exactly the kind of usage for which hyper-links excel. Using the nodes related to the specification language, the System generates a Specification Language Reference Card from short descriptions of terms and a Specification Language Manual with complete information.

1.4 Algorithm Templates

Some of the expert knowledge brought to bear in code synthesis is represented as abstract algorithm templates that capture the essentials of an algorithm but can be refined based on problem demands and then translated into any target language. Templates support the scalability of a PSE because they make it easy for end users as well as developers to add new algorithms. Many linear solvers and other algorithms are recorded in the literature in a form very similar to the templates.

1.4.1 The Template Declaration Language

Templates are defined in an algorithm description language that is independent of spatial dimensionality, data structures, and target language considerations. The rich language of pseudo-code expressions includes various matrix operators (e.g., dot product, the arithmetic operators, transpose, norm, diagonal, and identity) and transcendental operators, as well as the usual scalar operators for numbers and Booleans. It also includes easily recognizable procedural control structures. In addition to conventional loop, while, and until constructs, special constructs allow looping over the range of abstractly specified subsets or supersets of array dimensions, and mapping of operation sequences over variable lists. A special dimension can be identified and loops defined over just the special or the non-special dimensions. Some parallel constructs record opportunities for distributed computation.

TABLE 1.4.I.A

Template Declaration for a Conjugate Gradient Solver

Template [ConjugateGradient, SolverTemplate,
SubroutineName[CGSolver],
LocalVars[p[SameAs[y], "search direction vector"],
q[SameAs[y], "image of search direction vector"], TABLE 1.4.I.A-continued Template Declaration for a Conjugate Gradient Solver

```
        zz[SameAs[y], "conditioned residual"],
        alpha[Real, "multiple of search direction vector"],
        beta[Real, "orthogonalization constant"],
        rho[Real, "temporary variable"],
        old[Real, "old value of rho"],
        iter[Integer, "iteration counter"],
    Templates [Preconditioner],
    Code[r = y − svar.xx;
        old = r.r;
p = 0;
        Until[iter, maxit, StopCode,
            zz = r;
            commentAbout["Apply preconditioner",
                Preconditioner[y −> r. xx −> zz1];
            rho = r.zz;
            beta = rho / old;
            p = zz + beta p;
            q = svar.p;
            alpha = p.q;
            alpha = rho / alpha;
            xx = xx + alpha p;
            r = r − alpha q;
            old = rho]]];
```

Data declarations in templates are quite different than those of Fortran or C. The System's type annotations, rather than providing fixed storage declarations, allow declarations in terms of configurations of other variables, including those from problem's equations. In this way they resemble the automatic data objects of Fortran 90. Declarations can state that a new array has the same shape as another array, or the same shape but with some dimensions deleted or added, or with dimensionality and range based on the ranges and shapes of other problem or template variables.

Templates can be composed just like subroutines in a programming language. The need for a subordinate or "called" template is declared by introducing an identifier, much as local variables are declares. In the pseudo-code, the "call" is represented as a reference to that identifier, signifying only that some class of routine, such as a solver or a preconditioner, is needed at that point. The specific choice of solver or preconditioner is not fixed in the calling template declaration, but rather is a design choice. During synthesis, the template identifier takes on the "value" of an instance of the subordinate template class selected by the specification 'Or system's decision mechanism. For example, in Table 1.4.1A, the identifier "Preconditioner" is declared. Its appearance in the code indicates where to insert the preconditioner call. By default, the System will opt for a no-action preconditioner for the conjugate gradient solver, but users may override this choice by naming any suitably configured preconditioner template.

The System's knowledge base represents each template as a class in a hierarchy of template classes. This hierarchy allows for a separation of concern in template declarations as well as defining families of options for various -kinds of algorithms. Among the major classes of templates are solvers, time evolution templates, stepping algorithms, and inverse problem or test wrappers (e.g., for automatically generating convergence rate testing code). Using normal object inheritance, aspects like variables or template place holders defined high in the hierarchy are known in all the subclasses and need not be re-declared. For example, in Table 1.4.1 A the StopCode declaration is inherited by the ConjugateGradient solver from its super-class, Solver Template.

TABLE 1.4.1.B

Class Hierarchy for Evolution Templates

```
EvolutionTemplate
    SteadyState
    TimeDependent
        TimeDependentEvolve
            Movie
            Evolve
            Motion
            DiscreteEventsGeneral
        TimeDependentFixed
            TestingTemplate
                ConvergenceRateTest
            EvolveFixed
            MotionFixed
```

Names for both variables and template place-holders can also be drawn from other templates. Mechanisms are available to refer to the variables that exist in the template's "caller" or in the System's problem state, and to do a form of parameter passing from templates to their subordinate templates.

A template declaration can also provide an indexing scheme, i.e., a function that transforms the generic indexing operations in the code declaration to more concrete operations appropriate for the synthesized data structures.

A template declaration can include certain programming directives. For example, it may specify whether the System should expand the template in line or encapsulate it as a named subroutine.

TABLE 1.4.1.C

Pseudo-Code for PreConditioned ConjugateGradient

```
seq[assign[r1, g1 − Sal . xx1],
    assign[old1, r1 , r1], assign[p1, 0],
    seq[assign[iter1, 1],
        seq[if[toll < 8*eps1,
            print["Warning:Linear tolerance is too small.",
                toli, "< 8*", eps1, "."], seq [ ]],
            comment ["Compute the static stopping criteria information"],
            commentAbout ["The norm of the rignt hand side",
                assign[normg1, norm[g1]]],
. . . ]]]
```

1.4.2 Template Translation

The System contains a rich collection of templates written by its developers and submitted to the System via a translator that builds them into the System's object and rule knowledge base. The same translator will be available to users, so that if the templates they need are not already in the System, they may declare them and have them incorporated as first class objects in the synthesis environment. To ensure all the pieces fit together in a sensible manner, the language supports good syntax-checking and type-checking, both at template declaration time and at synthesis time.

When a template is declared, the template translator automatically creates an attribute in the template class corresponding to each variable that the template can access and each subordinate template place holder: it also creates methods for filling in the values of these attributes.

1.4.3 Templates During Synthesis

During synthesis, the System creates an instance of the selected template class and fills in its attributes as the problem demands. For the highest level components of the algorithm, such as the evolution template and the solver template, the System decides what templates to use as the synthesis process moves from mathematics into algorithm construction. Next, the System fills in the names of the specific variables that can be accessed by extracting them from the problem state or from calling templates, or, in the case of local variables, by defining variables of the appropriate kind and shape. For the attributes corresponding to template place-holders, the methods instantiate the new templates, and the process continues recursively.

In the next step of template processing, the System builds pseudo-code for the various template instances. The work is done by methods derived by the template translator from the code part of the template declaration. The first step is fill in the pseudo-code from the declaration with the variables and code for subordinate templates previously derived. Thus, where a subordinate template is called, the template code (see below) for that template is inserted, either in-line or as a subroutine call. The pseudo-code for the conjugate gradient solver in the diffusion example appears in Table 1.4.3.

Next, the indexing function, if present, is applied to the pseudo-code. This function transforms the abstract indexing given in the pseudo-code to a concrete form appropriate for the shape of the data structures for the particular variables in the code. No such transformation is specified for the conjugate gradient solver in our example.

call[CGSolver, seps1, f, g1, iMax, jMax, SA1]

Table 1.4.3: Template Code for Calling ConjugateGradient

Finally, if the template is to be cast into a subroutine, the System-encapsulates its code as a subroutine object with appropriate variable declarations and replaces the pseudo-code with a call to the subroutine. This call will be incorporated into the code for the calling templates. If the code is to be in line, no action is needed. The resulting code for calling the conjugate gradient solver in the diffuision example appears in Table 1.4.3.

1.4.4 Data Structure and Operations

The ability to generate and customize data structures is one technique that makes the use of flexible abstract algorithm templates feasible. Although the templates declare some minimal constraints on the type of date required, they do not specify the concrete data structures to be used. The System generates these in a manner that customizes them to the specifics of the problem description to minimize the space used by the data structures and the time required to operate on the data structures. The use of mathematical representations of the data structures and their processing by computer algebra both frees the System from having to store libraries of cross products of how to implement all operations on all combinations of data structures and allows an infinite number of representations to be generated based on the specific problem being solved.

Although object-oriented assembly allows data structures to be separated from algorithms, component generation goes further in allowing an infinite number of representations to be customized for the specific problem being solved. For example, after equations are transformed into discrete representations, the "stencil"—the number of neighboring points (which can differ in each direction) in an approximation—is used to determine a specialized array representation. The operations are initially represented with sums and products and enumerations over the full array, with the special array represented with conditional constricts.

As a much simpler example, a diagonal array f[i,j] is represented by if[i==j, f [i], 0].

Operations are then simplified using computer algebra. For example, the sum of two diagonal arrays, is simplified from doPar[doPar[f[i,j]+g[i,j], <iRange>], <jRange>]

via doPar[doPar(if[i==j, f[i], 0]+if[x==y, g'[i], 0], <iRange>], <jRange>]

to dopar[f[i]+g'[i], <iRange>]

With multi-dimensional stencil arrays and more complex operations such as transpose, the representations and optimizations are much more complicated. A large set of rules are required to simplify expressions involving conditionals, parallel and sequential statements, parallel and sequential loops, comments, and arithmetic and logical operations.

This situation-based derivation avoids the necessity for a storing a large library of specialized components to handle the cross product of operations and data structures.

2. Diffusion Example

2.1 Diffusion Problem Specification

If a Cartesian coordinate system, with x and y as the spatial variables and t as the time variable is used to describe the problem, then textbooks give the simple diffusion equation as

TABLE 2.1

| Problem Specification in Cartesian Coordinates | |
| --- | --- |
| $\frac{\partial f}{\partial t} = \frac{\partial^2 f}{\partial x^2} + \frac{\partial^2 f}{\partial y^2},$ | (Eqn. 1) |
| (* Geometry *) | |
| Region [0<=x<=2&&0<=y<=3&&0<=t<=1/2, Cartesian [{x,y}, t]]; | (Eqn. 2) |
| (* The PDE *) | |
| When [Interior, der [f ·t] == der [f,{x,2}] + der [f, {y,2}]; SolveFor [f]]; | (Eqn. 3) |
| (* The BCs*) | |
| When [Boundary, f == 0]; | (Eqn. 4) |
| (* The IC *) | |
| When [Initial Value, f == 50 Sin [Pi x/2] Sin [Pi y/3]]; | (Eqn. 5) |
| (* Evolution Algorithm *) | |
| Movie [frames == 11]; | (Eqn. 6) |
| (* Performance *) | |
| RelativeErrorTolerance [.01]; | |
| (* Runtime Interfaces *) | |
| Output [f, Labelled]; | |
| Dimensionless; | | where the solution f=f(x, y, t) is a function of the space and time variables. If the physical region in x-y-space is chosen where the PDE is to be solved as a simple rectangle with the time interval chosen to be the infinite interval starting at t=0:

$$0 \leq x \leq 2,\ 0 \leq y \leq 3,\ 0 \leq t \leq \infty, \quad \text{(Eqn. 7)}$$

The boundary of this region has four pieces. A Dirichlet boundary condition is chosen for the full boundary, that is, the solution is set to zero on each piece of the boundary:

$$x=0,\ 0 \leq y \leq 3,\ t \geq 0\ f(0, y, t)=0,$$

$$x=2,\ 0 \leq y \leq 3,\ t \geq 0\ f(2, y, t)=0,$$

$$y=0,\ 0 \leq x \leq 2,\ t \geq 0\ f(x, 0, t)=0,$$

$$y=3,\ 0 \leq y \leq 2,\ t \geq 0\ f(x, 3, t)=0, \quad \text{(Eqn. 8)}$$

The initial condition, at t=0 and for $0 \leq y \leq 3$ and $0 \leq x \leq 2$, is chosen to be $$f(x, y, 0) = 50\sin\left(\frac{xx}{2}\right)\sin\left(\frac{xy}{3}\right) \qquad \text{(Eqn. 9)}$$

It is known that the solution of this problem decays rapidly to zero, so the final value of time $t_f$ to be used in the program can be set rather low, say $t_f=\frac{1}{2}$.

It is desirable to create a movie of the solution; that is, a sequence of three-dimensional plots of the solution f (x, y, t) at equally spaced times. A problem specification that can be used to create a FORTRAN code to solve this problem is given in Table 2.1. This file contains comments delineated as (* comment *), which may be omitted.

The statements in the problem specification given in Table 2.1 are direct translations of the mathematical statements into specifications in the problem specification language. The first argument to Region is a Boolean combination, using the logical and operator &&, of inequalities, while the remaining two arguments are optional. The Boolean argument is used to describe the space-time region; the first optional argument specifies the coordinate system and the second gives the name of the region. The region must be specified using less than or equals (<=) or greater than or equals (>=) rather than strict inequalities. Cartesian takes one or two arguments. The first is a list of the spatial coordinates, of which there may be one, two, or three. The second argument is the name of the time variable. This specification produces a Cartesian coordinate system with axes labeled by the members of the first argument.

The PDE, that is, the diffusion or field equation, is given using standard mathematical operators from Mathematica as well as der, which replaces the Mathematica D. As with D, der specifies some derivative of its first argument; the remaining arguments are lists of two items where the first is the variable with respect to which the derivative is to be taken and the second is the order of the derivative, for example:

$$\frac{\partial^2}{\partial x^2} \frac{\partial^3}{\partial y^3} f \to \text{der}[f, \{x, 2\}, \{y, 3\}] \qquad \text{(Eqn. 10)}$$

The == is the standard mathematical equality which coincides with Mathematica's notation.

The use of der rather than the Mathematica D points out one of the shortcomings of most computer algebra systems for tasks such as discretizing differential equations. Mathematica's D is designed to compute derivatives. Most of the time in this application, the derivatives are formal, that is, derivatives of an abstract function. Typically the function is to be computed numerically, so the properties of the D operator are not useful, and in fact, frequently produce results exactly the opposite of what is needed. For example, it usually not appropriate to apply the chain rule. Also, in coordinate free notation it is desirable to omit the dependencies, which would normally cause D to return 0.

When [<region>, <eqn>] specifies an equation and a region over which the equation holds. It takes two arguments: the first is a Boolean that describes pieces of the space-time region, or a name of a previously described region, while the second is a partial differential equation, a boundary condition, or an initial condition or a name of a previously described equation. For more complex problems, systems of equations can replace a single equation.

The specifications Initial Value, Interior, and Boundary are shorthand, respectively, for the physical region at the initial time, the interior of the full space-time region, and all of the boundary of the full space-time region. For example, if the region is given the name R as in Region [0<=x<=2 && 0<=y<=3 && 0<=t<=2, Cartesian [0{x, y}, t], R]

then Interior means Interior [R], which is equivalent to the

Region 0<x<2 && 0<y<3 && 0<t<2.

The boundaries and the equations for the boundary conditions can also be given explicitly; in this example, an equivalent specification to When [Boundary, f=0] would be When [x==0, f>=0]; When [x==2, f==0]; When [y==0, f==0]; When [y==3, f==0];

SolveFor specifies what variables to solve for; it can be omitted if the solution variables are obvious. Movie says to integrate an evolution problem with output at the ends of equal time intervals, the number of which are given by frames==11. A specification of the results to output is given by the expressions in Output. In this case, the values for f in the full region, are written into a file that can be used to plot the solution. The argument Labelled specifies that the values of time and the spatial points where f is computed are included in the file. Far more detailed control over the output is available. The RelativeErrorTolerance gives a heuristic tolerance for the relative error. The System does not guarantee that this tolerance will be met. The Dimensionless specification tells the System the problem is dimensionless, thereby suppressing checks for the consistency of physical units in equations.

For straightforward problems, this is all that needs to be specified. There are many other defaults that the System will use to translate the problem specification given in Table 2.1 to a numerical code. For example, the numerical code produced is, by default, is FORTRAN-77, but this can be changed to C for example. Also, the System will select what it considers appropriate Discretization methods and solvers if the specification does not indicate what to use.

It is easy to modify the problem specification in Table 2.1 to solve the convection diffusion equation.

$$\frac{\partial f}{\partial t} = \frac{\partial^2 f}{\partial x^2} + \frac{\partial^2 f}{\partial y^2} - \frac{\partial^2 f}{\partial x} - \frac{\partial^2 f}{\partial y}, \qquad \text{(Eqn. 11)}$$

2.2 A Coordinate-free Description of Diffusion

The equation specification given in Table 2.1 is only useful in Cartesian coordinates, so if a problem were given on a circular wedge, a completely new problem specification would be needed and the diffusion equation would have to be manually transformed into polar coordinates. In fact, another significant use of computer algebra in the System is writing partial differential equations in Mathematica's thirteen standard orthogonal coordinate systems and in general coordinates so that automatic grid-generation techniques can be used. The best approach, therefore, is to write the differential equation and as many of the initial and boundary conditions as possible in a coordinate-free notation and then let the System figure out how to write them in the desired coordinate system.

In coordinate-free notation, the PDE is expressed mathematical as $$\frac{\partial f}{\partial t} = \sigma \nabla^2 f \qquad \text{(Eqn. 12)}$$

where a parameter or parameter variable σ has been added, and where $\nabla^2$ is the Laplacian; in two-dimensional Cartesian coordinates, the Laplacian is $$\nabla^2 f = \frac{\partial^2 f}{\partial x^2} + \frac{\partial^2 f}{\partial y^2} \qquad \text{(Eqn. 13)}$$

The physical region is still a rectangle, but now we give the length of the sides with the parameters α and β is:

$$0 \leq x \leq \alpha,\ 0 \leq y \leq \beta,\ 0 \leq t \leq \infty \qquad \text{(Eqn. 14)}$$

Also, one of the zero Dirichlet boundary conditions is changed to the parametric value A:

$$f(0,y,t)=0,\ f(\alpha,y,t)=0,\ f(x,0,t)=0\ f(x,\beta,t)=A \qquad \text{(Eqn. 15)}$$

while the initial condition is chosen to be $$f(x, y, 0) = \beta \sin\left(\frac{\pi x}{\alpha}\right)\sin\left(\frac{\pi y}{\beta}\right), \qquad \text{(Eqn. 16)}$$

where β is a parameter in the IC. (In this case, if A≠0, the boundary condition is not consistent with the initial condition. However, this is not a problem for the diffusion equation.)

Again, the problem is to create a movie of the solution using the values for the parameters that were used in the previous problem (see Table 2.1), but with A=100. The System problem specification for solving this problem is given in Table 2.2. The Incline specification tells the System to replace the listed variables by their values in the code (all instances of A will have 100 substituted, and so on). Computer algebra is used to propagate the effects of constant substitution; entire equations are eliminated if appropriate.

The expression Laplacian is the notation used by the System for the Laplacian. The System also knows about the divergence, gradient, and curl.

Note that parameters can be included in the equations as variables whose values can then be set in other equations. When a formula like sigma==0.01 is used, it typically results in code for setting the value of the parameter sigma occurring early in the numerical program, but parameter values can also be read from the terminal and from files. Because σ is small, $t_f$, (tfinal) should be taken large. Use of parameters facilitates changing problems quickly. Note that the form When [Boundary, f==0] acts the default boundary values for f to zero on the full boundary. This is then overridden on the piece of the boundary with y=β by using the form beginning When [y==beta, . . . ]. The specification OneFile given in the Output specification will cause all of the data to be written to a single file.

The user has not specified the numerical algorithm to be used in solving this problem. Therefore, the System will use its defaults, and employ a simple forward difference operator in time (first-order accurate and explicit), and central difference operators in space (second-order accurate). The resulting algorithm is simple, not requiring the solution of a large linear system). However, it has the well known disadvantage for diffusion equations that the time step must be deceased in proportion to the square of the spatial grid size.

TABLE 2.2

Coordinate-Free Problem Specification

| | |
|---|---|
| (*Geometry*) | |
| Region [0<=x<=alpha && 0<=y<beta && 0<=t<=tfinal, | |
|   Cartesian [{x,y},t]]; | (Eqn. 17) |
|   alpha == 2.0; beta == 3.0; tfinal == 10.0 | |
| (*The PDE*) | |
| When [Interior, der [f,t] == sigma laplacian]f]; | (Eqn. 18) |
|   sigma == .1;SolveFor[f]]; | |
| (*Default Boundary Condition*) | |
| When [Boundary,f == 0]; | (Eqn. 19) |
| (*Specific Boundary Condition*) | |
| When [y == beta, f == A; A == 100]; | (Eqn. 20) |
| (*Initial Condition*) | |
| When [Initial Value, | |
|   f == β Sin [Pi x/2] Sin [Pi y/3];B == 50]; | (Eqn. 21) |
| (*Evolution Algorithm*) | |
|   Movie [ frames == 5]; | |
| (*Performance*) | |
|   RelativeErrorTolerance [.1]; | |
| (*Runtime Interfaces*) | |
|   Incline [ {alpha, beta, tfinal, sigma,A,B}]; | |
|   Output [f, Labelled, OneFile]; | |
|   Dimensionless; | |

2.3 Variable Coefficients and Heterogeneous Material

In addition to specifying numerical values for parameters, parameters can also be functions of other variables. In the previous examples, the independent variables are x, y, and t, while f is the dependent variable which is to be solved for as a function of the independent variables. In the previous example, the variables σ,β,β,$t_f$, A, and B are parameters. In this example, a heterogeneous material property is defined to illustrate how to define more complex parameters.

Heterogeneous materials can be modeled using coefficients that are defined by functions with a jump. For example, the coefficient sigma in the previous problem, could be defined with jump functions.

$$\sigma(x, y) = 1 \quad x > 1 \text{ and } y > 2 \qquad \text{(Eqn. 22)}$$
$$\{1/100x \leq 1 \text{ or } y \leq 2$$

However, because the coefficient c is not constant, the differential equation must be written in terms of the divergence and gradient. To solve this problem, the specifications following the comment (* The PDE *) in the problem specification given in Table 2.2.1 are replaced by (* The PDE *)
  When [Interior,
    der [f,t]==div [sigma grad[f]]
    sigma==if[x>1 && y>2, 1, 1/100]];

Note that the "if" statement has three arguments: the first is a Boolean; if the first argument is true, then the value of the second argument is returned; while if the first argument is false, then the value of the third argument is returned. Everything else in the problem specification is unchanged from Table 2.2.1.

The fact that the coefficient sigma has a jump has a strong impact on the type of algorithm that should be used to solve the problem. The jump-coefficient effect can be achieved in other ways, such as specifying multiple regions, each with their own equations, or specifying the values of coefficients in material property files.

2.4 Specifying the Solution Procedure

In the specification for the heat diffusion problem, Table 2.2.1, the following specifications were used to control the solution procedure and consequently the kind of numerical code that the System generates:

(* Evolution Algorithm *)
  Movie [frames==11];
(* Performance *)
  RelativeErrorTolerance [0.01];
(* Runtime Interfaces *)
  Output [f, Labelled, OneFile];

These specifications can be modified or augmented by additional information. A main feature of a code for the solution of an initial-boundary value problem is the overall time-stepping loop which is given by an evolution algorithm. The evolution algorithms are recorded in evolution templates. The next issue in designing a solution algorithm is the time discretization and a spatial discretization. The main types of time discretizations are explicit and implicit, and the typical space discretization is central. Implicit discretizations require the use of a linear equation solver. These choices complete the overall algorithm.

Other important details can also be specified. The performance criteria control the accuracy and amount of work required to solve the problem. The main point is to choose either a relative error tolerance for the solution or to directly specify the grid size. There are currently two programming languages available: Fortran-77 and C. The run-time interfaces include input and output.

2.4.1 Evolution Algorithms

The evolution algorithm controls the structure of the overall time stepping loop. Some of the critical features are how to choose the time step, in particular, whether to use a fixed or variable time step, and where to print the results of the computation. Changing the Movie specification to Evolve will cause output to be generated only at the beginning and end of the time interval. There are several other evolution templates available.

2.4.2 Time Discretizations

For diffusion equations, the default discretization is the simple explicit or forward Euler discretization. This is chosen because it is simple to implement and effective for small problems, but this has the disadvantage that a large number of time steps is required. Diffusion equations are more typically discretized using implicit methods. This produces an additional problem that a linear solver is needed for the resulting system of equations. The System will choose one if none is given in the specification. The Crank-Nicholson time discretization is commonly used and this can be specified by adding CrankNicholson:

to the specification file. Now there is no stability constraint, but accuracy requires that the number of time steps be proportional to the number of spatial steps.

The default linear solver is Gauss-Siedel (SOR with the relaxation parameter $\omega=1$). In this simple problem, a tridiagonal solver is better choice. This choice can forced by adding TriDiagonal;

to the specification file.

2.4.3 Spatial Discretizations

For diffusion equations, the default spatial discretizations are second-order central differences, but there are many other discretizations available. Here is another point where computer algebra plays a critical role. The discretizations are given as Mathematica replacement rules that apply to a system of equations, or just to one equation, or if necessary, only to a particular term in an equation. Many discretizations are developed by using the series expansion capabilities of computer algebra. Also, after the discretization is complete, the System uses Mathematica functions to simplify the discretized equations and collect the coefficients of the discretized unknown function, which are known as the stencil coefficients for the discretized equation. In addition to applying the built in discretization rules, users can define their own replacement rules for special discretizations.

2.4.4 Performance Criteria

Performance criteria are related to the choice of grid sizes and accuracy tolerances and are the major factors in the amount of work required to solve the problem. The System has some simple heuristics to choose a spatial-discretization size given a relative error tolerance as in RelativeErrorTolerance [0.001];

Note that using the specification

RelativeErrorToicrance [retol];

without specifying a value for retol, will require the relative error tolerance to be input at the terminal when the numerical code is run. Given the spatial discretization size, the System then determines a time-discretization size. However, the grid sizes can be specified directly, for example, to test several grid sizes, in which case grid size values can be read from the terminal. However, care should be taken not to violate any stability constraints. For example, the relative error tolerance specification can be replaced by nMax==4*iMax**2;
  GridSize [{{iMax, iMax, nMax}}];

Note that no value is given for iMax, so when the Fortran code is run, it will request a value for iMax, the spatial discretization size.

2.4.5 Programming Languages

There are currently two numerical programming languages available: the default Fortran-77 and C, which are specified by Fortran;

or

Clang;

The numerical precision in the generated codes can be controlled by using

Single;

which is the default, or

Double;

The System can be extended to other programming languages.

2.4.6 Runtime Interfaces

Runtime interfaces refer to how input and output are handled, whether or not subroutines are to be generated as separate code or are to be in-lined, and how the code generated by the System will interface with other codes.

The most obvious way to initialize a variable is to provide an equation for it in the specification, as was noted the examples given previously. In most programming languages, variables can be scalar, typically real or complex, or any array of real or complex numbers. The System generates code appropriate for the type of variable. For example, scalar variables that are mentioned in a special dictation but not given a value are, by default, read from the terminal, while array variables are, by default, read from a file. The procedure for scalar variables is illustrated in the examples.

However, it is also possible to output the gradient of the solution or the solution and its gradient, for example, the specification Output [{f, grad[f]}, "Data", Labelled];

will cause t, x, y, f $\partial f/\partial x$, and $\partial f/\partial y$ to be written to some output files. The string "Data" determines the first part of file names and the data for each value of t is written to a different file because the specification OneFile was omitted.

Figure 2:
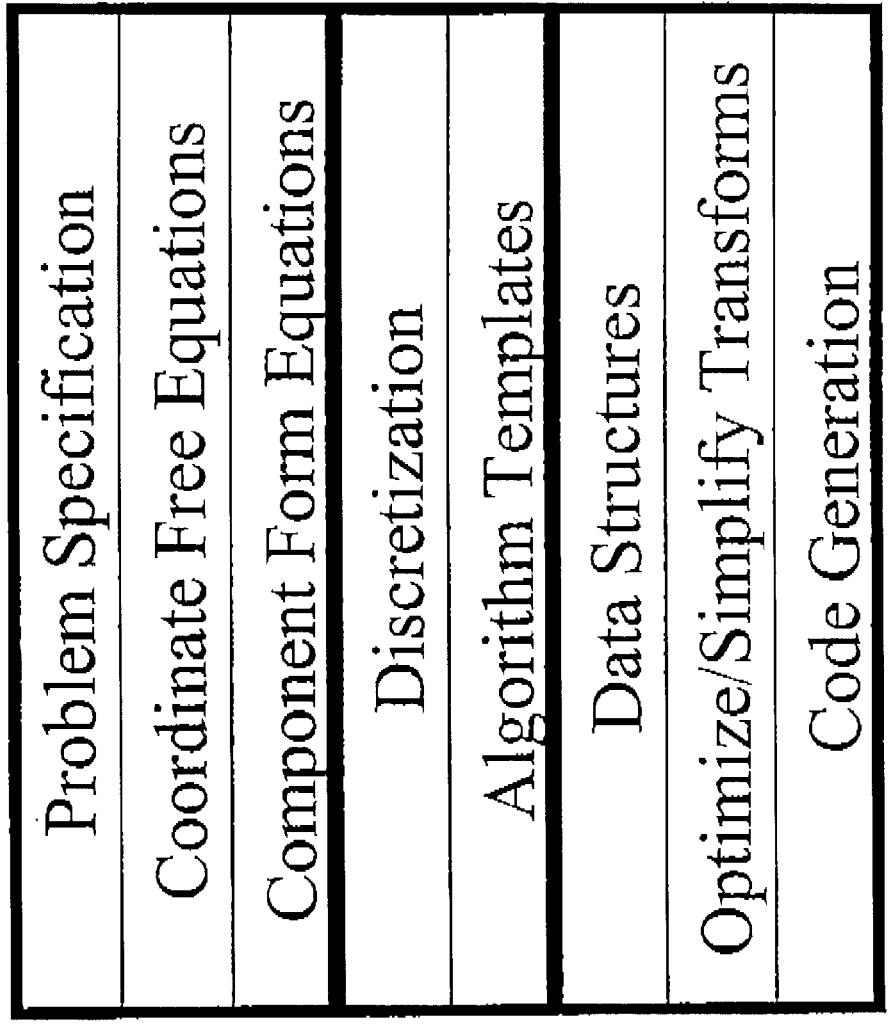
FIG. 2 is a block diagram illustrating the levels of refinement of the method thereof.
Figure 3:
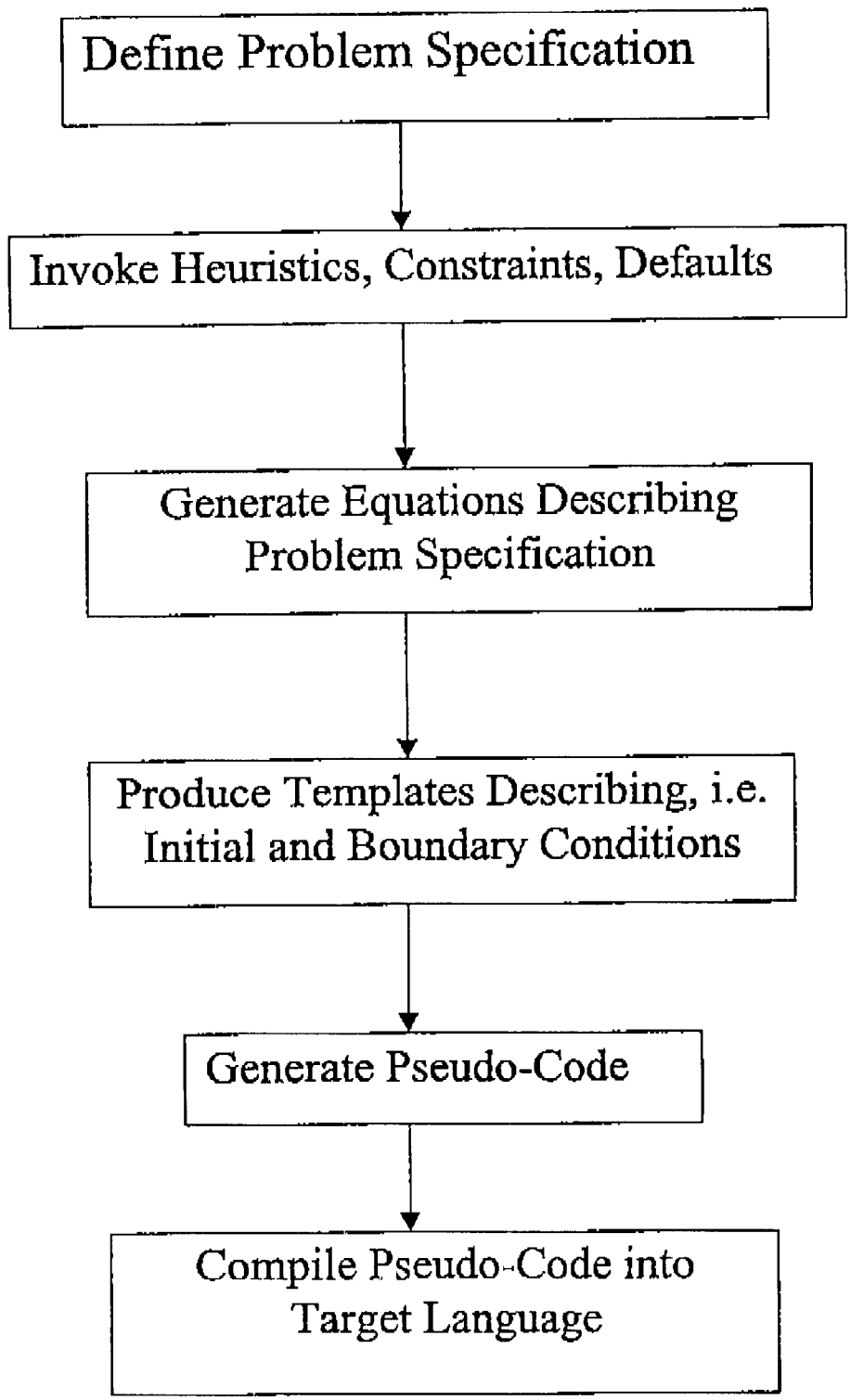
FIG. 3 is a flow chart illustrating an embodiment of the present invention.
Figure 4:
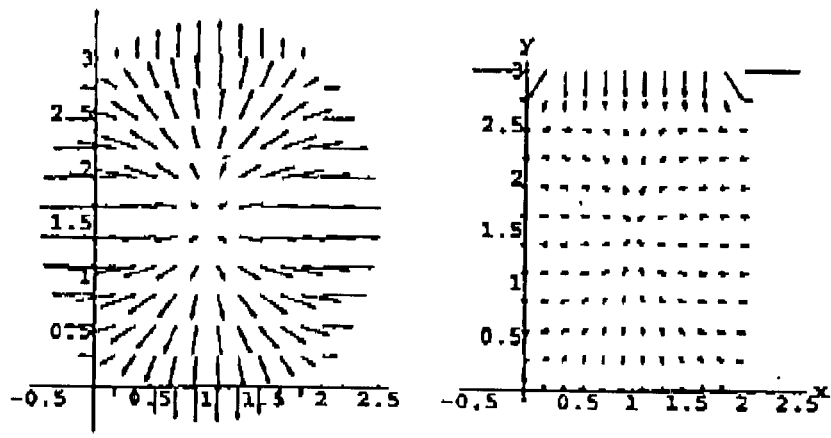
FIG. 4 comprises a series of graphs depicting heat flow for the diffusion problem example.
Figure 4:
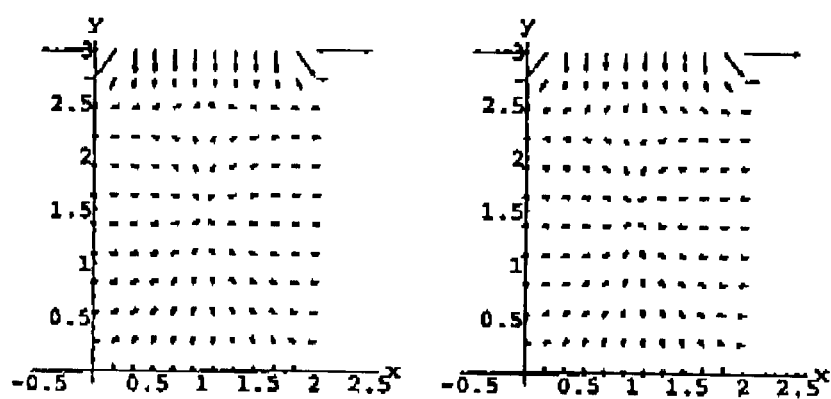
Figure 4:
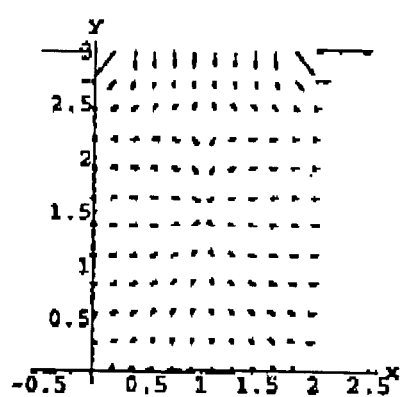

The specification given in FIG. 2.3 can be modified to put the negative of the gradient of the solution using Output [{-grad [f]}, "Data", Labelled];

The gradient can be plotted as in FIG. 4 using the Mathematica PlotField package. Note that the plots in FIG. 4 clearly show that the initial heat distribution

3. Financial Instruments

3.1 Background

New types of exotic options and new twists on familiar ones proliferate as customers demand instruments structured to specific requirements. Models for these new instruments must be generated quickly and inexpensively. Although some analytic formulas exist, most are based on assumptions, e.g. constant volatilities or continuous sampling of spot prices, that may lead to unacceptable errors when applied to practical pricing problems. Most often, analysts rely on such numerical methods as binomial trees, Monte Carlo simulation, or finite difference solution of the governing partial differential equations (PDEs).

The current method of generating computational pricing models, like scientific modeling software in general, is conventional programming: a tedious cycle of coding, debugging, testing, and re-coding, quite ill-suited to the present demands. The System and method-of the present invention provides a process of automatically transforming very high level specifications that mirror the mathematical description of the problem into efficient code in a conventional programming language such as C or Fortran, thereby eliminating the programming step completely. The System is well suited for problem in modeling financial instruments.

The System synthesizes finite difference codes for general PDES, and produces pricing models for exotic options. The System displays numerical results from the generated codes and compares them to exact and approximate analytic results and to Monte Carlo results. A specification for a complex option might occupy less than a page and yet generate (in less than an hour) a commented, modular C code of several thousand lines, yielding several orders of magnitude increase in software productivity.

The System can apply finite difference techniques to complex option pricing problems that have been traditionally attacked with Monte Carlo or tree methods. These latter methods are popular largely due to the perception that they are easy to program. When specifications are made at a high level and programming considerations eliminated, the various methods can be judged on speed and accuracy alone. In many cases of practical interest, finite difference methods have significant performance advantages over other methods.

3.2 Pricing Options with Finite Difference Methods

The use of finite difference methods for solving partial differential equations pre-dates the modem computer. A huge body of experience exists in such diverse applications as computational fluid dynamics, electromagnetics, and seismic wave propagation. Convergence rates are generally rapid and well understood. The Black-Scholes equation commonly used for options valuation and its generalizations are ideal candidates for finite difference solution since they are generally linear and because they generally contain dominant diffusive terms that lead to smooth solutions. (Although linearity simplifies the finite difference solution of PDEs, it is certainly not a requirement.)

Tree methods have an intuitive appeal, and it is easy to show that trinomial trees are closely related to explicit finite difference methods. However, trees for options involving multiple assets or interest rate securities with arbitrary interest rate process models can be difficult to construct, while the corresponding finite difference models are generally straightforward. It is easy to generate finite difference schemes that are second order accurate, i.e., whose error decreases as the square of the number of time steps. Tree pricing methods are generally first order accurate. With respect to Monte Carlo techniques, finite difference methods have three important advantages, the accurate calculation of hedging parameters, ease of implementing early exercise features, and speed of computation.

Because the Black-Scholes equation is so well suited to finite difference solution, the System requires only fairly simple algorithms for most option pricing problems (relative to fluid dynamics, for example). An introduction to finite difference methods for solution of general initial-boundary value problems may be found in (A), while a thorough discussion of finite difference methods specifically for option pricing is found in (B) (all references cited herein incorporated by reference for background).

3.3 Example 1: An American put

3.3.1 Abstract Specification

When producing modeling codes, scientists and analysts begin with an abstract specification of the problem to be solved and the techniques to be applied. This specification can often be described to a colleague in a short conversation, yet it conveys virtually all significant aspects of the desired code. Suppose the problem is to generate a finite difference model of American put options. An abstract specification might be:

"Solve the Black-Scholes equation in a region with one Cartesian space dimension S, the underlying spot price, and one time dimension t. At the minimum price boundary the option value is the strike price K, and at the maximum PCE boundary the option value is zero. The initial condition is the standard payoff. Constrain the option value to be greater than or equal to the payoff. Use Crank-Nicholson differencing for stability, and a SOR solver to invert the resulting matrix. Write the code in C using double precision arithmetic."

The mathematical expression of this abstract specification consists of the Black-Scholes equation (using backward time), pertinent initial and boundary conditions, and constraints:

$$\frac{\partial V}{\partial t} = \frac{\sigma^2}{2} S^2 \cdot \frac{\partial^2 V}{\partial S^2} + (r - D_0) S \frac{\partial V}{\partial S} - rV \quad \text{(Eqn. 23)}$$

$$V(0, t) = K$$

$$V(\infty, t) = 0$$

$$\text{payoff}(S) = \max(K - S, 0)$$

$$V(S, 0) = \text{payoff}(S)$$

$$V(S, t) \geq \text{payoff}(S)$$

Despite this mathematical rigor, many details, principally algorithm and programming considerations, have been omitted, to be supplied by common modeling practice. While human translation of such specifications into code are routine, the process is error-fraught and time consuming.

3.3.2 The Program Synthesis Specification

TABLE 3.3.2

Example Specification for American put

```
Region[0<=S<=SMax && 0<=t<=T, Cartesian[ {S },t]];
When[Interior, CrankNicholson;
der[V,t]==½ sigima^2 S^2 der[V, {S,2} ] +
(r–D0) S der[V,S] – r V]];
payoff==Max[K–S,0];
When[min[S], V==K];
When[max[S], V==0];
When[min[t], V==payoff];
Constraint[V >= payoff];
SOR;
TargetLanguage[C];
  Double;
```

The System automatically generates the required numerical code from a specification, shown in Table 3.3.2, that is remarkably similar to the abstract description. The Region (solution domain) is defined in terms of spot price S and backward time t. For an option involving multiple underlying assets, the domain would be multi-dimensional. The System can handle an arbitrary number of spatial dimensions. Users can also specify transformations to generalized coordinates which concentrate grid points near 'specific points such as strike or barrier prices.

The Black-Scholes equation is specified in the Interior, i.e., the "not-boundary" part of the region. For entering PDE's in text form, the System uses the notation der[V,S] for $\partial v/\partial s$. S is the spot price, sigma the volatility, "r" the risk-free interest rate, and $D_0$ the continuous dividend rate. The boundary condition at the minimum price boundary, S=0, is the usual one, while at the maximum S boundary the option value is simply set to zero, with the understanding that users will set SMax, the maximum value of S, large enough (typically about four or more times the strike price) that the induced error will be negligible. The initial condition for our solution is the usual payoff at expiry for a put, Max[K–S,0l, where K is the strike price, and integrated in backward time from expiry to the present value.

3.3.3 Discretization

Specifying a discretization method, CrankNicholson, in the Interior, where it will determine the discretization of the Black-Scholes equation. This implicit differencing method is unconditionally stable and second order accurate in the time step Δt. Since not specified otherwise, the System will use its default second-order central space differencing in the S direction.

Discretization methods for systems of PDEs, individual PDEs, or even selected terms of a PDE may be chosen by the analyst (or by the System if omitted from the specification) from an extensive suite of pre-defined numerical methods, including splitting, Alternating Direction Implicit, and Crank-Nicholson. Alternatively, users may design custom discretizations. For example, in a multidimensional model, such as an outside barrier option, one may want fourth-order differencing in the spot price dimensions and Crank-Nicholson differencing in time, except for mixed derivative terms (those involving the price correlations of the underlying) which are to be second-order in spot price and explicit in time. Such a novel discretization is specifiable in a few lines.

3.3.4 Solvers and Constraints

As in this example, most practical numerical algorithms for Black-Scholes and related equations involve implicit differencing for numerical stability, resulting in a linear system of equations to solve. Linear solvers may be selected from about a dozen predefined algorithms known to the System or called from a static library of the user's choosing. The predefined solvers are represented as pseudo-code templates that are expanded incline as the System builds code, taking advantage of knowledge of the specified data representation and properties of the associated matrix.

Various preconditioners are also provided. The pseudo-code representations of algorithms in (including solvers) are abstract, devoid of references to specific dimensionality, data structures, equations, or target language, but with notions of parallelism (incorporated for future generation of codes in parallel and distributed languages.)

The American feature requires the application of a constraint: the option value cannot be smaller than the payoff. The appropriate formula is simply given as an argument to the Constraint statement. Constraints may be applied inside the selected solver as it iterates toward a solution, or outside the solver after convergence has been achieved. The former approach is better. When the constraint is applied inside a successive over-relaxation solver (the so-called projected SOR method) the result can be shown to converge to the correct solution. In this example, a SOR solver is specified. The constraints are applied inside the solver, and in fact, anywhere in the code that the values of constrained variables are reassigned.

The choice of over-relaxation factor, omega, has a critical influence on the performance of SOR solvers. Users may specify solver parameters, e.g. SOR[omega==1.25, maxit==100, tol==tol=10^(–5)]. The optimum value of omega, however, is problem specific and difficult to estimate. The System provides an iterative refinement algorithm for 0,SOR[RefineOmega], which may result in a substantial reduction in the R number of iterations. An optimized value for w is generally more effective in problems that do not have constraints.

Finally, the System specifies the precision and target language of the code to be generated, namely Double and C. Alternative choices for target language are Fortran and Fortran90. The ten-line specification in generates (in less than ten minutes on a high-end PC) about three hundred lines commented, modular ANSI standard C code for finite difference valuation of American puts.

3.3.5 Improved Specification

TABLE 3.3.5

Specification for American put, with greeks,
improved initial condition.hz,1/32

```
Region[0<=S<=SMax && 0<=t<=T, Cartesian[ {S},t]];
When[Interior, CrankNicholson;
BlackScholes1D[V->P, Keywords->{Vega,Rho}]];
payoff == Max[K–S,0];
Constraint[P >= payoff, if[P==payoff, Vega==0;
Rho==0]];
When[min[S], P==K;
Rho==0;
Vega—==0];
When[max[S], P==0;
Rho==0;
Vega==0];
When[min[t], Vega—==0;
Rho==0;
P == if Abs[S–K] > delta[S]/2,
(K–S+delta[S]/2) 2/(2 delta[S]), payoff]];
SOR;
Default[ReadFile["pinit.dat"]];
Greekout[V->P];
TargetLanguage[C];
  Double;
```

Next, the System incorporates some additional features in this model to improve its accuracy and utility. Table 3.3.5 shows an improved specification. The first new feature is the "equation generator" BlackScholes1D, used to specify the Black-Scholes equation. It is convenient to place the definitions of frequently used equations in a separate specification file. Simply mentioning the name of the file expands it as a macro. Typically, there are several forms of the equations of interest, or as in this case, additional equations, which are selectable via Keyword arguments in the macro expansion. Macros may be defined for any sequence of frequently used specification commands, and they may even be arbitrarily nested. Here, the System used a substitution rule, V→P, in expanding the macro, to rename the option value variable from the default V to P.

3.3.6 Hedging Parameters, Equation Generators

In order for the American put model to be useful for hedging as well as pricing it must calculate the hedging parameters, i.e. the greeks. The System can use symbolic algebra (e.g. Mathematica) to derive new equations from existing ones. For example, it can differentiate the Black-Scholes equation with respect to any of its parameters to form equations for the greeks. These new equations are then automatically discretized and solved along with the Black-Scholes equation. Boundary and initial conditions for the new quantities must be provided, of course. In Table 3.3.2 the System invokes BlackScholes1D with the Keywords Vega and Rho, directing that two additional equations for these quantities be produced and solved.

The greeks, Delta, Gamma, and Theta do not require PDE's that are integrated in time. While the System could generate such equations, it is wasteful to do so. These parameters can be derived from the instantaneous option value by differentiation with respect to S or t. This simple differentiation can be done in the Output commands discussed below.

TABLE 3.3.6

Equation Generate Blackscholes1D

PhysicalMeaning[S,Dollars];
    Create the Dependent Variables
    Variable[SMin, Scalar, Dollars,   "minimum price"];
    Variable[SMax,  Scalar, Dollars,   "maximum price"];
    Variable[K,     Scalar, Dollars, "strike price"];
    Variable[sigma,  Scalar, Time^(-½), "volatility"];
    Variable[r,     Scalar, Time^(-1), "interest rate"];
    Variable(D0,     Scalar, Time^(-1), "continuous dividend yield"];
    Variable[V,     Scalar, Dollars, "option value"];
    (* Create and name Black-Scholes Equation for option value V *)
    Equation[-der[V,t] + (½)sigma^2 S^2 der[V, {S,2} ] +
        (r–D$_0$) S der[V,S] – r V==0, ValEqn];
    (* Create and name the equation for Vega=der[V,sigma] *)
    IsAKeyWord[Vega,
    Variable[Vega, Scalar, Dollars Time^(½), "Vega: der[V,sigma]"];
    Equation[Greek[ValEqn, {Vega,der[V,sigma]}], VegaEqn]
    ];
    (* Create and name the equation for Rho=der[V,r] *)
    IsAKeyWord[Rho,
      Variable[Rho, Scalar, Dollars Time, "Rho: der[V,r]"];
      Equation[Greek[ValEqn, {Rho,der[V,r]}], RhoEqn]
    ];

An equation generator is simply a macro file that encapsulates the definition of an equation, its optional variants, and other related declarations. Table 3.3.6 shows the equation generator file BlackScholes1D.eqn. the System expects coordinate variables to have dimensions of length. The first line of this file simply informs the System that the coordinate variable S has units of Dollars. Next, we give the system some information about the important parameters such as sigma and r, namely their tensor order, their units, e.g., {Dollars}, and a definition string. The tensor order and units are used by the system to check the equations and boundary conditions for tensor order and units consistency. If tensor order and units information are not given, the system uses the defaults Scalar and Dimensionless. The definition strings are incorporated into comments in the generated code.

Next, the Black-Scholes equation is specified and given a name, ValEqn, for later reference. If Vega is present in the Keyword list, the variable Vega is created with appropriate units, and a new equation for it, VegaEqn, is generated automatically by operating on ValEqn with the differentiating function Greek. It needn't be specified by hand. Finally, an equation for Rho is created if the KeywordRho is specified. Generalization of this technique to define equations for other hedging parameters is straightforward. Thus, invoking BlackScholes1D with both keywords defines these additional equations:

$$\frac{\partial \rho}{\partial t} = \frac{\sigma^2}{2} S^2 \frac{\partial^2 \rho}{\partial S^2} + (r - D_0) S \frac{\partial \rho}{\partial S} - r\rho + S \frac{\partial V}{\partial S} - V = 0 \quad \text{(Eqn. 24)}$$

$$\frac{\partial \vartheta}{\partial t} + \frac{\sigma^2}{2} S^2 \frac{\partial^2 \vartheta}{\partial S^2} + (r - D_0) S \frac{\partial \vartheta}{\partial S} - r\vartheta + \sigma S^2 \frac{\partial^2 V}{\partial S^2} = 0 \quad \text{(Eqn. 25)}$$

where $\rho$ and $\vartheta$ are Rho and Vega respectively. Returning now to the specification in Table 3.3.6, the System supplies constraints for the hedging parameters. The addition to the Constraint statement simply says that if the option value P has reached its constraint, then it can no longer depend on volatility or interest rate, so Rho=Vega=0.

3.3.7 Improved Initial Condition

A small change to the initial condition for P in Table 3.3.5 increases the accuracy and consistency of the model. In the continuous world of the Black-Scholes equation, the initial condition for the option value is just the payoff function we have defined. However, in the discrete world of the finite difference solution, using P[S,0]==payoff generates small errors near the strike price K where payoff has a discontinuity in slope. The final option value depends slightly on whether K falls on a grid point or between grid points. This dependence can be largely eliminated by slightly modifying the initial option value near the strike so that the area under the payoff curve (in the sense of "trapezoidal rule" integration) is conserved delta[S] is the System's text notation for the discretization increment in the S dimension, ΔS.

The improved initial condition specification for P uses the conditional statement if[ . . . ] to set P=payoff at all but the single grid point closest to K, where P is modified so that the numerical and analytic areas under the payoff curve are identical. The general form for the if statement is i[test, statements, statements], where the first group of statements generates code for the case that test is true, while the second group of statements generates code for the case that test is False.

3.3.8 Input/Output

Finally, the specification of Table 3.3.5 directs the system to handle input and output in specific ways, rather than relying on system defaults. The System sets the default so that any variables such as the strike price K or maximum price SMax, not explicitly defined by an equation will be read from the file pinit.dat. Output can be tailored for convenient entry into most any visualization or post processing package. Because the System reuses the output specifications for the option value and the greeks so often, it can put them in a macro file. The file Greekout in thisexample is such a macro. It contains statements such as \Output[der[V,S], "delta.out""]+. Placing expressions in Output statements is how it defines and outputs the hedging parameters.

Figure 5:
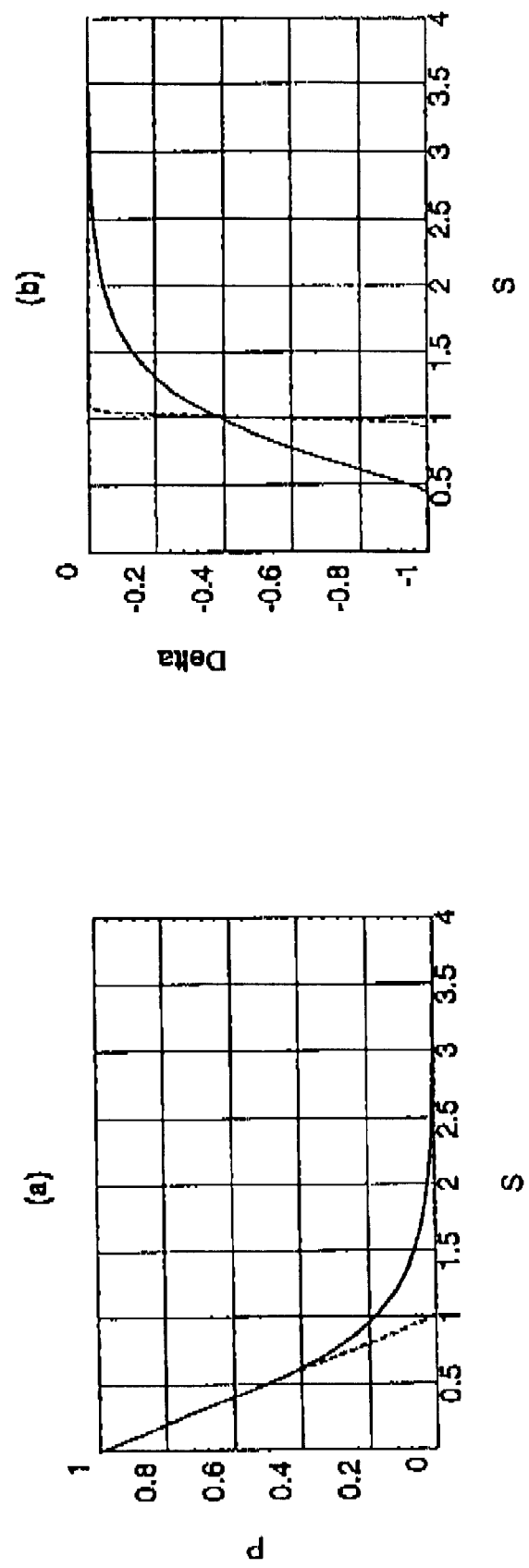
FIG. 5 is graphs of the results for the American put relating to expiration.

FIGS. 5(a) and (b) show the Results for the American put where (a) depicts expiration (dotted curve) and present (solid curve) values, and (b) shows expiration (dotted curve) and present (solid curve) values of, Δ Parameters used: T=1.0, D0=0.025, sigma=0.5, r=0.05, K=1.0, iMax=100 (number of Sgrid points), nMax=20 (number of t grid points), SMax=4.0.

Figure 6:
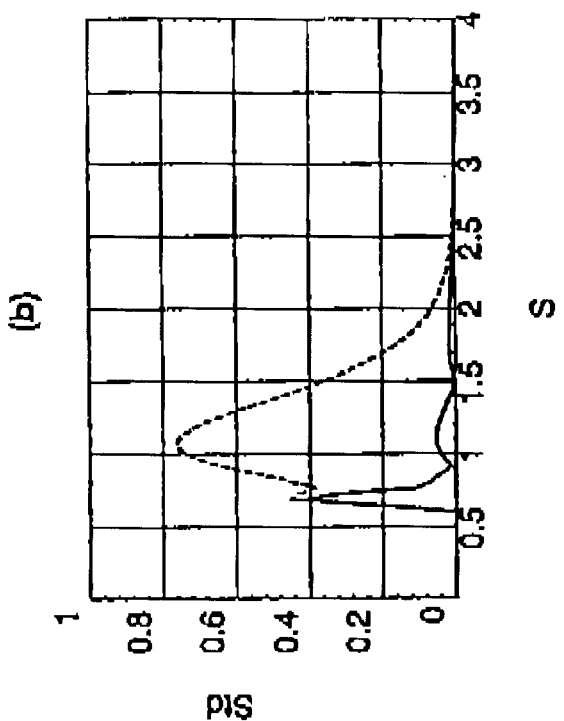
FIG. 6 is a pair of graphs which illustrate the result for an American put depicting the standard deviation and errors.
Figure 6:
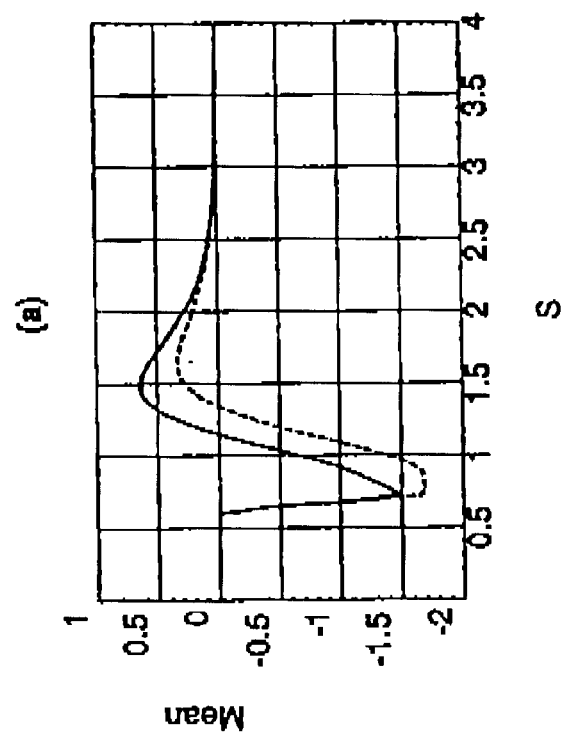

FIGS. 6(a) and (b) show the Results for the American put, where Mean (a) and standard deviation (b) of the errors (x 10^4) in the present option value with simple initial condition (dotted curve) and improved initial (solid curve) condition, as the strike K is varied around a grid point.

3.3.9 Numerical Results

FIGS. 5(a) and (b) show the initial and final values of P and Delta calculated by the synthesized finite difference code. The American feature has the expected effect, increasing the value of the put. FIGS. 6(a)(b) show the displays the mean error in the final option value for eight slightly different values of the strike K in the range 1−delta[S]/2 K 1+delta[S]/2. The dashed curve is the simple initial condition specified in Table 3.3.1 while the solid curve is the improved initial condition in Table 3.3.2. The mean values of the error are approximately the same, for either initial condition, a few basis points. However, the standard deviation of the error, shown in FIG. 5(b)), is reduced by more than an order of magnitude for the improved initial condition. The small variation of option value with the position of K relative to the finite difference grid is nearly eliminated, falling to a tiny fraction of a basis point. (A very narrow region in which standard deviation is not significantly changed, marks the location of the American free boundary.) Since an analytic solution does not exist for this option, error has been measured relative to an identical calculation that has ten times the number of Sgrid points.

3.3.10 Switches

A final enhancement to the put option specification is to incorporate a switch to allow generation of three distinct codes from one specification, shown in Table 3.3.4. The System declares a Boolean variable american. To generate a code for a European option, the system simply types american→False before beginning synthesis. The min[S] boundary condition is changed appropriately, the Constraint code is not generated, and a direct TriDiagonal solver is used instead of the slower, iterative solver SOR. If american→True is defined before synthesis, the previous model is recovered. Finally, if leaving american undefined at synthesis time, a code is generated that contains branches for both European and American options. American then becomes an input variable, read from the default input file. Its value at execution time determines the type of option priced.

TABLE 3.3.10

Specification for American/European put, with greeks

Boolean[american];
Region[0<=S<=SMax && 0<=t<=T, Cartesian {S},t]];
When[Interior, CrankNicholson;
    BlackScholes1D[V->P, Keywords->{Vega Rho}]];
payoff == Max[K-S,0];
if[american, Constraint[P >= payoff; if[P==payoff; Vega==0; Rho==0]]];
When[min[S], Rho==0; Vega==0; if[american, P==K, P=32 K Exp[-r t]]];
When[max[S], P==0; Rho==0; Vega==0];
When[min[t], Vega==0; Rho==0;
    P == if[Abs[K-S]>0, (K-S+delta[S]/2)^2/(2 delta[S]), payoff]];
If american, SOR, Tridiagonal];
Default[ReadFile["pcinit.dat"]];
Greekout[V->P];
TargetLanguage[C]; Double;

3.4 Example 2 Discrete Knockout Call in Generalized Coordinates

Like the American option evaluated in the first example, barrier options are path dependent, but they provide very different numerical challenges. Both Monte Carlo methods and trinomial trees show poor convergence for barrier problems. Several methods have been developed to address these problems. For trees, one obvious step is to ensure that the tree nodes fall exactly on the barrier price. This is not always easy to do, especially in higher dimensions. With finite differences this is a simple matter. However, this example generates generalized grids that concentrate grid points near the barrier. This is accomplished with a few extra lines of specification, but results in vast improvement in accuracy.

This example also introduces discrete sampling of path information, e.g., activation of a knockout barrier only at the end of the trading day. Using program synthesis, complex code segments such as those that model the discrete sampling of a barrier, the payment of a discrete dividend or sampling of the spot price for a lookback option are generated from pseudo-code templates. These templates are invoked via simple keyword commands in the specification.

3.4.1 Generalized Coordinates

General coordinate transformations are used in the numerical solution of PDE's to increase the density of grid points in critical regions and to allow coordinate systems to conform to complex boundaries. Adaptive grids are generated by time-dependent general coordinate systems to conform that adapt to the evolving solution. The System currently provides for generalized coordinate transformations specified by formulas. Automatic numerical generation of grids with various smoothness and orthogonality properties is under development.

The following modes a European knockout call with a discretely sampled barrier using a coordinate transformation to concentrate grid points near the barrier. The mathematical specification of the problem is $$\frac{\partial V}{\partial t} = \frac{\sigma^2}{2} S^2 \cdot \frac{\partial^2 V}{\partial S^2} + (r - D_0)S\frac{\partial V}{\partial S} - rV \quad \text{(Eqn. 26)}$$

$$V(0, t) = 0$$

$$V(\infty, t) = 0$$

$$payoff(S) \; max(S - K, 0) \; \text{for} \; S < B$$

$$V(S, t) = 0 \qquad \text{for} \; S \geq B \; \& \; t \in \{t_i\}$$

where B is the knockout barrier price, and $t_i$ is the set of barrier sampling times. The specification is given in Table 3.4.1.

TABLE 3.4.1

Specification for European knockout call in generalized coordinates.

Region [0<=xi<=1 && 0<=tau<=TMax, GeneralCoordinates[xi,tau]];
OldCoordinates[ {{S},t}];
    S== if[xi<=xiB,
Smin + alpha c1 (1 −Exp [−A xi]);
Smax − alpha c2 (1 −Exp[A (xi−1)]);
T=tau;
c1= 1+(B−SMin)/alpha;
c2==1+(SMax−B)/alpha; A==Log[c1 c2];
xiB==Log[c1]/A;
payoff--Max[S−K,0];
When[Interior, CrankNicholson; BlackScholes1D[ ]];
When[min[xi]|| max[xi], V==0],
When[min[tau], V==payoff];

TABLE 3.4.1-continued

Specification for European knockout call in generalized coordinates.

TriDiagonal;
DiscreteEvents[ Barrier[direction[S],
    functions[{if[S>=B, V==0]}],
    ReadFile[tsample, "tbar.dat"],
    nsample==nbar]];
Default[ReadFile["barinit.dat"]];
Output[V, "V.out", OneFile, Labelled];
TargetLanguage[C]; Double;

The System specifies GeneralCoordinates [xi,tau] as the coordinate system, where xi $\xi$ and tau ($\tau$) are the new spatial and time coordinates, respectively. By convention, the coordinates xi and tau appearing in the Region statement are uniformly spaced. In multidimensional problems, the space they define is logically rectangular. Next, we specify the equations defining the coordinate transformation to the "old" coordinates S and t, the coordinates in which the PDE's are defined. In general these equations are nonlinear relations, so that the uniform sampling of the logical space defined by the new coordinates is mapped into a non-uniform sampling of the "physical space" defined by the old coordinates. In multi-dimensional problems the logically rectangular regions of the new coordinates can be mapped into physical regions which may be of fairly arbitrary shape. Similarly, if the old time coordinate is given as a non-linear function of the new time coordinate, we can compress or expand time. Our spatial coordinate transformations here are time independent, i.e. stationary, but we can also define moving, or time-dependent coordinate systems. The System automatically transforms all the equations, interior, boundary, and initial, to the new coordinates. For example the Black-Scholes equation becomes:

$$\frac{\partial V}{\partial \tau} = \frac{\sigma^2}{2} \frac{S^2(\xi)}{J(\xi)} \frac{\partial}{\partial \xi}\left(\frac{1}{J(\xi)} \frac{\partial V}{\partial \xi}\right) + (r - D_0)\frac{S(\xi)}{J(\xi)} \frac{\partial V}{\partial \xi} - rV \quad \text{(Eqn. 27)}$$

where $J(\xi)=\partial S(\xi/\partial\xi)$ is the Jacobian. The transformation of this one dimensional equation is a fairly simple matter. In higher dimensionality however, such manipulations can become exceedingly complex, e.g. transforming the Navier-Stokes equations of fluid dynamics to three dimensional, time-dependent generalized coordinates. The System however, handles this readily. By default, equations are discretized in conservative form (the chained derivatives in the above equation are not expanded.) This is the preference of most experts, and is also appropriate when the coordinate transformation is not known analytically as it is here, but only in tabular form, as passed from a numerical grid generator, for example. In one space dimension, effective grid spacing in the original coordinate is proportional to $J(\xi)$ The transformation used here is $$S(\xi) = S_{min} + (S_{max} - S_{min})\frac{\xi - Aw\left(\tan^{-1}\left(\frac{\xi - \xi n}{w}\right) + \tan^{-1}\left(\frac{\xi n}{w}\right)\right)}{1 - Aw\left(\tan^{-1}\left(\frac{1 - \xi n}{w}\right) + \tan^{-1}\left(\frac{\xi n}{w}\right)\right)} \quad \text{(Eqn. 28)}$$

$$t = \tau \quad \text{(Eqn. 29)}$$

$J(\xi)$ and hence the grid spacing, is minimum near $\xi_0$ 3.4.2 Discrete Barriers To model a discretely sampled barrier, the System does not simply place the region boundary at the barrier and enforce the boundary condition of option value equal to 0 or to discounted rebate, if applicable. Because the boundary condition is enforced at every time step, this represents a continuously sampled barrier (even though time itself is discrete in our finite difference model). Instead, the System places the region boundary well beyond the barrier, S_{max}> B in this case, let the option value "diffuse" over the barrier between sampling dates, and then enforce the knockout condition only at the discrete sampling dates.

In the previous example, the time evolution template was not specified and hence, defaulted to a simple time loop with equal fixed time steps. The DiscreteEvents statement specifies a time evolution template in which the solution is integrated in time from the initial condition (option expiry) up to the first discrete event time. A discrete event, e.g., sampling of a barrier or path variable, or paying a discrete dividend, is executed by making the appropriate interpolation or assignment of option value and any hedging parameters. Then, integration proceeds to the next discrete event time. Each particular event (actually, series of events) has an associated array of event times. The generated code keeps a marker designating the next time $\Delta t$ in each series and adjusts t, if necessary, to land exactly on the time of the next pending event, or if the last event has been executed, on the final time (the present in backward time.) There are currently four discrete event descriptors in addition to Barrier. They are Dividend, Asian, Lookback, and Path. Asian and Lookback are special cases of the more general Path. Dividend pays a discrete dividend. All four operate by making an interpolation in a spot price or path dimension based on path information accumulated at discrete intervals. Any number of descriptors may be specified in the DiscreteEvents command.

In the Barrier descriptor, one gives the direction in which the barrier acts, here spot price S, a conditional representing the barrier crossing, and a list of functions or conditions to be applied when the barrier is crossed. Other arguments include files where the number of samples and the sampling times may be found. Optional arguments such as nsampl== nbar allow renaming a variable for the number of samples. The System then refers to this name in other parts of the specification file, and avoid name collisions. The direction specifications in Barrier seem superfluous in this single asset example, but they are needed in multi-asset problems where there may be different discrete barrier sampling times for each of several assets.

3.4.3 Numerical Results

TABLE 3.4.3

Comparison of finite difference and Monte Carlo
results for the value of an at-the-money European
call with a discretely sampled up-and-out barrier.
nbar is the number of discrete barrier samplings,
equally spaced. Other parameters are: **TMax = 1.,
iMax = 5000, K = 100., nMax = 40000,
r = 0.05, sigma = 0.25, SMax = 200., B = 150.**
DISCRETELY SAMPLED EUROPEAN KNOCK-OUT CALL

| Nbar | Monte Carlo 10,000 paths | Monte Carlo 100,000 paths | finite difference |
|---|---|---|---|
| 4 | 7.772 ± 0.118 | 7.922 ± 0.038 | 7.956 |
| 16 | 7.154 ± 0.112 | 7.294 ± 0.036 | 7.353 |
| 64 | 6.773 ± 0.108 | 6.904 ± 0.035 | 6.935 |
| 256 | 6.542 ± 0.105 | 6.667 ± 0.034 | 6.694 |

Table 3.4.3 compares results of the finite difference code with Monte Carlo results for the value of an at-the-money European call with a discrete knockout barrier as a function of the number of barrier samples. The finite difference grid is uniform and has 5000 grid points, reducing truncation error to insignificant levels. The spot and strike prices are S=K=100, the barrier is B=150. Other parameters are listed in the table caption. The finite difference and Monte Carlo results differ by about the Monte Carlo variance for all sampling intervals. However, the finite difference values are consistently higher. This is reasonable given the significant increase in the Monte Carlo values as the number of paths is increased. A further order of magnitude increase in paths would be expected to raise the Monte Carlo values, bringing them into closer agreement with the finite difference values. It is interesting that there is a large difference between even daily sampling, nbar=256 and the continuously sampled value of 6.442.

Figure 7:
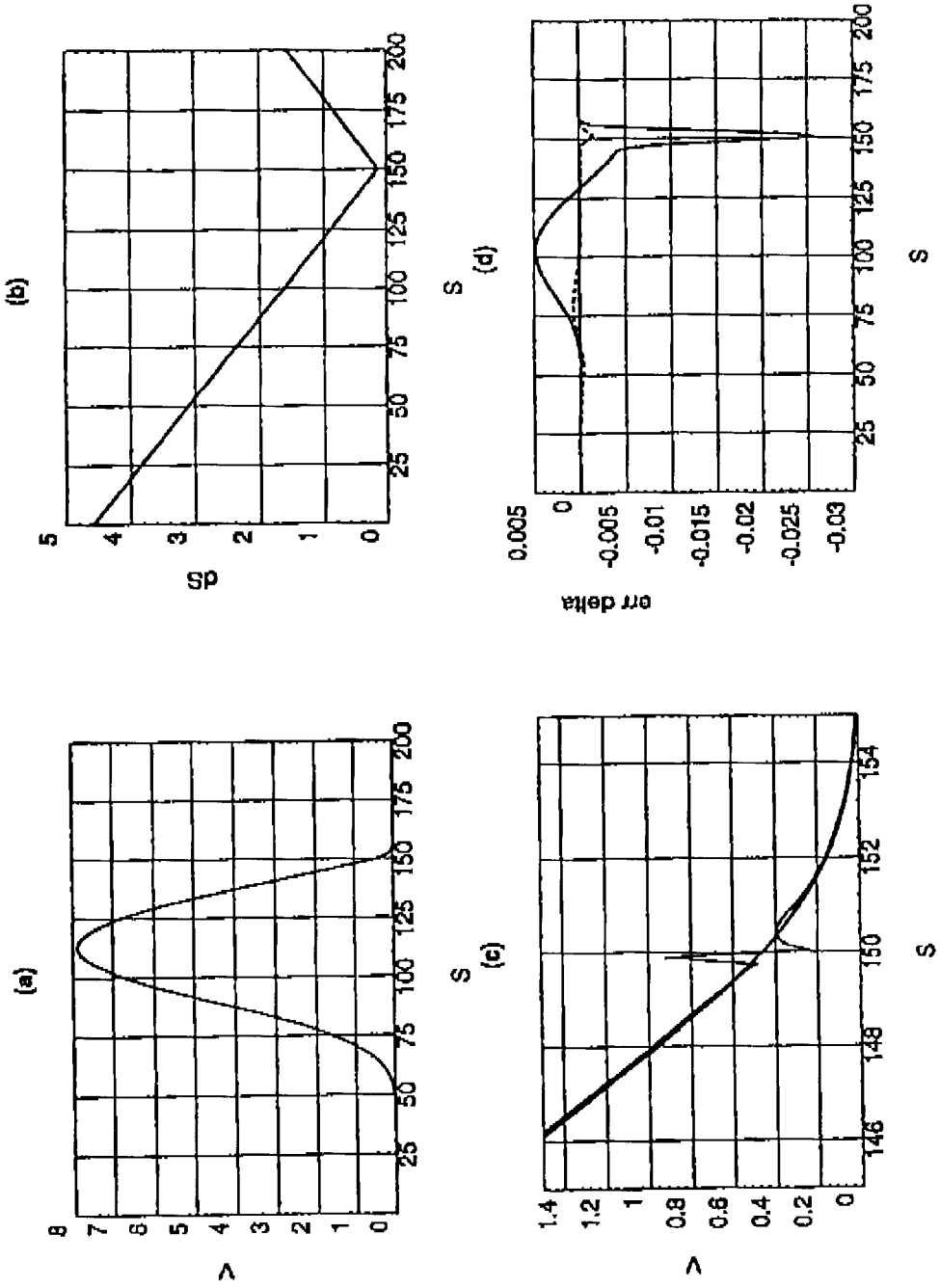
FIG. 7 is a series of graphs illustrating the parameters associated with the European knockout call.

FIGS. 7(a) and (b) show Results for a discretely sampled Europan knockout call, with: (a) present option value with a 200 point nonuniform grid, (b) effective grid spacing Δ of the nonuniform grid, (c) present option value with nmax= 1000 and nmax=10000, (d) error in the hedge parameter Δ for 200 point uniform grid(solid curve) and 200 point nonuniform grid (dotted curve). Other parameters are: are Tmax=1., K=100, I=0.05, sigma=0.25, Smax=200, B=150, nbar=256.

FIGS. 7(a) and (b) display finite difference results for the knockout call with nbar=256, i.e., approximate daily sampling. Just 200 grid points in spot price S have been used, but the coordinate transformation concentrates grid points near the barrier B. The present option value is displayed in FIGS. 7(a)(b) as a function of spot price. The value is small but finite for S≧B, reflecting the possibility that the price will move below the barrier before the first sampling. The effective grid spacing, $(2S/\partial\zeta)\Delta\zeta$ is displayed in FIGS. 7(a)) and (b). Using alpha=5, results in a ratio of about thirty for the largest to smallest spacing on the grid. The grid spacing near the barrier is about one seventh that of a uniform grid of the same dimension.

While the Crank-Nicholson time differencing used in the examples is unconditionally stable, truncation error can still result in undesirable behavior if the time step is too large with respect to the characteristic grid diffusion time. When a coordinate transformation is used to reduce the grid spacing, the time step must also be reduced to avoid the problem. This is illustrated in FIGS. 7(a) and (b), which shows the present option value near the barrier for different numbers of time steps, nMax==1000 and nMax==10000. The larger value of nMax yields a smooth solution but with the smaller one, a spike appears near the barrier. This spike is not a symptom of numerical instability, but rather, that with the larger time step, the very sharp gradients that are periodically produced by setting the option value to zero for S≧B on barrier sample dates, do not decay fast enough. Indeed, with Crank-Nicholson differencing, a Nyquist mode on a finite difference grid has an amplification factor of minus one as $\Delta t \to \infty$ and decays not at all. Although the spike remains localized near the barrier, it reduces diffusion through the barrier and results in an option value which is everywhere too large. The resulting error in value is much less than that for a uniform grid, but several times that for the properly time-resolved nonuniform grid calculation. The errors in the hedge parameters Δ and Γ very near the barrier will obviously be worse than those in option value when the time step is too large.

FIGS. 7(a) and (b) compare the error in the hedge parameter delta for uniform (solid curve) and nonuniform grids (dotted curve) of 200 points, properly resolved in time. (Here, error is defined relative to the results of 5000 point uniform grid results.) The effectiveness of the nonuniform grid is evident. The following Table 3.4.3 displays RMS errors and relative CPU times for 200 and 2000 point uniform grids and a 200 point nonuniform grid. The nonuniform grid reduces RMS errors by factors of between fourteen and twenty-five, relative to the 200 point uniform grid. The cost of the huge reduction in error is an increase in CPU time due to the larger number of time steps. However, this is still a factor of twenty less than the CPU time required to achieve similar accuracies with a uniform grid. Comparing the errors for the uniform grid results, it is evident that near the discretely sampled barrier, the nominal second-order accuracy of the default finite difference algorithm does not hold.

3.5 Stochastic Interest Rates

Many interest rate derivative pricing problems can be posed as PDES, and are therefore suitable for synthesis. This example prices a cancelable swap under the Black-Karwinski (B-K) (see, F. Black and P. Karasinski, *Bond and Option Prices When Short Rates Are Logonormal*, Financial Analysts Journal, July-August, 1991, 52–59.) interest rate model, in which the interest process is given by $$dlnr=[v-lnr]dt+\sigma dXx \qquad \text{(Eqn. 30)}$$

where X is a Wiener process. P. Witmott, J. Dewynne, and S. Howison, *Option Pricing Mathematical Models and Computation*, Oxford Financial Press, Oxford, 1993. Derive the PDE for a swap in terms of the drift u(r,t) and volatility w(r,t) of the interest rate process, dr=u(r,t)dt+w(r,t)dX.

$$\frac{\partial V}{\partial t} = \frac{w^2}{2}r^2\frac{\partial^2 V}{\partial r^2} + (u-\lambda w)\frac{\partial V}{\partial r} - rV + r - r^* \qquad \text{(Eqn. 31)}$$

where λ is the market price of spot rate risk, and r* is the fixed leg of the swap. Estimating lambda is problematic, it is not necessary to do so. If bond prices are used to estimate the parameters for the spot rate process, then the observed drift bar u=(u−lambda w). With this fact in mind, the PDE for a swap under the B-K interest rate model becomes, $$\frac{\partial V}{\partial t} = \frac{\sigma^2}{2}r^2\frac{\partial^2 V}{\partial r^2} + [v-\beta \ln r]\frac{\partial V}{\partial r} - rV + r - r^* \qquad \text{(Eqn. 32)}$$

Unlike tree methods, in which the specific form of the interest rate process strongly influences the resulting numerical algorithm, finite difference methods are little influenced by the form of the interest rate model. Most any other Markov model may be easily substituted for the one implemented here.

TABLE 3.5

Specification for a cancelable swap.

```
Region[0<=r<=rMax && 0<=t<=TMax, Cartesian[ {r},t]];
  When[Interior, CrankNicholson;
  der[V,t] == /½ sigma^r^2 der[V, {r,2}] +
    (nu − beta Log[r]) r der[V,r] − r V + r − rstar];
  When[min[r], CrankNicholson; der[V,t] == −rstar];
  When[max[r], CrankNicholson; der[V,t]==
  (nu − beta Log[r]) r der[V,r] − r V + r − rstar];
  When[min[t], V==0];
  TriDiagonal;
  DiscreteEvents[
  Barrier[direction[r],
    functions[ {if[r>=B, V==0]}],
  ReadFile[tsample, "tbar.dat"],
  nsample==nbar]];
```

TABLE 3.5-continued

Specification for a cancelable swap.

Default[ReadFile("swpinit.dat"], DynamicAllocation];
Output[V, "V.out", OneFile, Labelled];
TargetLanguage[C]; Double;

The cancelable feature of the swap is represented in the specification of the discretely sampled barrier at r=B. At each sample time, the value of the swap V is set to zero for r>=B. Between samples, the source term {r-star}, and rate volatility give rise to an increasing value in the region r>B. The max [r] boundary condition is just the above equation with the curvature term neglected, a technique also used in Example 1. In fact, this boundary condition is of little consequence since it lies beyond the barrier.

Figure 8:
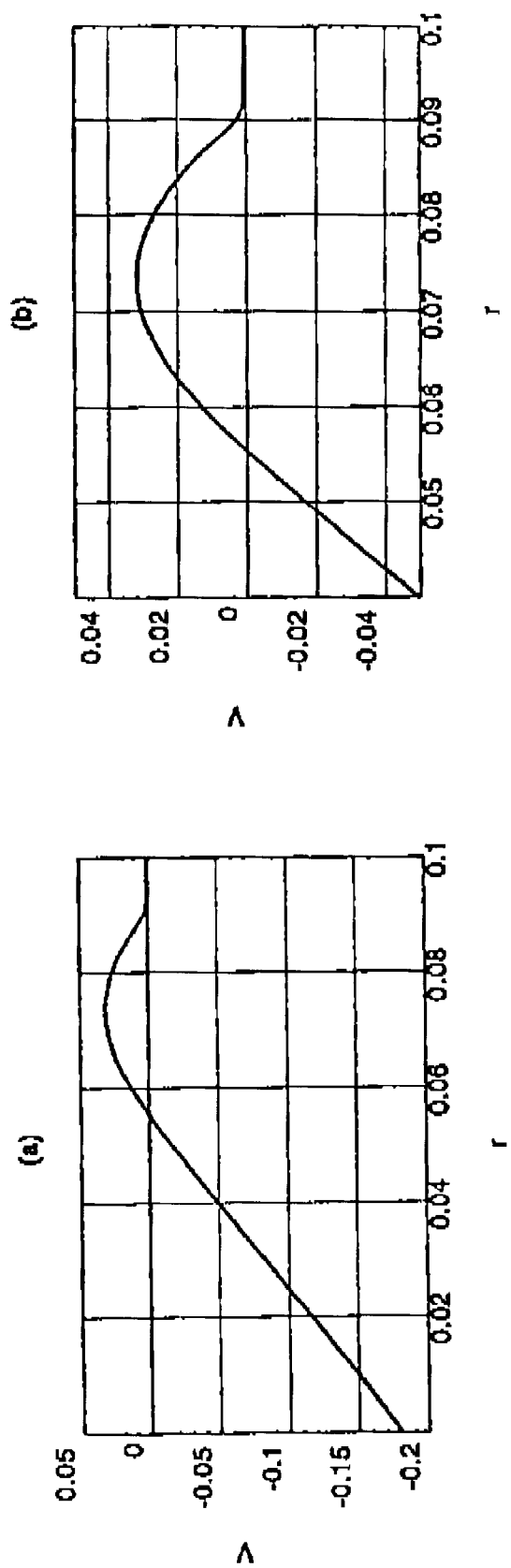
FIG. 8 is two graphs related to the Black-Karasinski interest rate model.

FIG. 8(a)(b) displays the present value of the swap. It has three years to run, and the barrier is sampled daily. The fixed leg of the swap is r*=0.06. The B-K interest rate model parameters used are: "σ=0.1", "υ=0.2" "β=−0.05", although in general, they may be functions of time. Δt {r=0} the swap value is V=−$T_{max}$r*. As expected for such frequent sampling, the swap value is quite small for r>B. V becomes positive for r slightly less than r* because of the mean reversion characteristics of the model, which tend to pull r down well below 0.05 for the chosen parameters.

FIGS. 8(a) and (b) show: (a) Value V of a cancelable swap under a Black-Karasinski interest rate model. (b) Same data on an expanded scale. The swap runs three years, r is sampled daily, and the barrier is at B=0.09. The fixed leg of the swap is r*=0.06. The B-K interestrate model parameters are: "σ=0.1", "υ=0.2" "β=−0.05", Other parameters are: Tmax 3, iMax=200, nMax=1000, nbar=256.

3.6 Example: European Call with Stochastic Volatility

A problem of much practical concern is finding a self-consistent approach for relaxing the Black-Scholes assumption of constant spot price variance, i.e., incorporating the so-called volatility smile into option pricing models. One alternative is to allow volatility to be a function of spot price and time, σ(S,t). This implied volatility is then postulated, a priori, or obtained via solution of an inverse problem from market data. In the latter case it may be available only as tabular data. The System can generate code for either case, defining a function for \sigma, using one that is supplied, or reading multi-dimensional tabular data and interpolating in the tables for the required values.

Another approach is to model volatility as a stochastic process. Several models have been proposed. In this example we specify a code that prices European options with a model proposed by S. Heston, *Review of Financial Studies*, 327–343, 1993. In doing so, we are not advocating a particular stochastic volatility model, nor the stochastic volatility approach in general. Rather, the model provides an application of the system to a quite interesting multi-dimensional example, for which an analytic solution is available for comparison.

The equation to be solved is:

$$\frac{\partial V}{\partial t} = \frac{1}{2}vS^2\frac{\partial^2 U}{\partial S^2} + \rho\sigma vS\frac{\partial^2 U}{\partial S \partial v} + \frac{1}{2}\partial 2vu\frac{\partial^2 U}{\partial v^2} + \quad \text{(Eqn. 33)}$$

$$rS\frac{\partial U}{\partial S} + [\kappa(\theta - v) - \lambda(S, v, t)]\frac{\partial V}{\partial v} - rV$$

In a departure from previous notation, here the option value is U, the variance of spot price is v, and sigma is the volatility of the variance, theta is the mean variance, kappa is the variance mean reversion rate, and rho is the correlation of volatility to spot price. For simplicity theta, kappa, and rho are constants although they could easily be made functions of time. Heston writes the market price of volatility risk as λ(S,v,t)=λv, where lambda is a constant.

TABLE 3.6

Specification for European call under Heston's stochastic volatility model.

Region[0<=S<=SMax && vMin<=v<=vMax && 0<=t<=TMax,
Cartesian[ {S,v},t]];
When[Interior, CrankNicholson;
der[U,t] ==/½ v S^2 der[U,{S,2}] + rho sigma v
S der[U,{S,1 },{v,1}]
+/½ sigma^2 v der[U, {v,2} + (r−D0) S der[U,S]
+ (kappa (theta − v) − lambda v) der[U,v]− r U];
When[min[S], U==0];
When[max[S], der[U,S]==Exp[−D0 t]];
When[min[v,Open] ||max[v,Open], CrankNicholson;
der[U,t] ===/½ V S^2 der[U, {S,2} ] + (r−D0) S der[U,S] − r U +
(kappa (theta −
v) − lambda v) der[U,v]];
When(min[t], U==Max[S−K,0]];
PCG[Preconditioner[SSOR]];
Default[ReadFile["volinit.dat"]11;
Output[U, "U.out", OneFile, Labelled]; TargetLanguage[C]; Double;

Table 3.6 shows the specification for this problem. The PDE of interest is two-dimensional. An extra dimension v is added to the Region statement to solve this equation, and supply additional boundary conditions. The System gives the PDE directly in the specification, although an equation generator could easily be built.

The min[S], max[S] boundary conditions are familiar ones. Appropriate boundary conditions for the min [v] and max[v] boundaries are not immediately obvious. Here the PDE of interest is given with the correlation and variance volatility terms deleted. The motivation is that in the case of constant volatility, "κ=λ=σ=0", the PDE of interest reduces to the one dimensional Black-Scholes equation in spot price S, with the variance v as a parameter. The chosen boundary conditions at min[v] and max[v] satisfy this condition. Notice that the boundary conditions contain derivatives both parallel and perpendicular to the boundary normal. The System by default will center the finite difference equations one-half grid point into the interior region to maintain second-order accuracy. With software synthesis, experimentation with different boundary conditions is easy because changes are made at the specification, rather than the code level.

The extra argument, Open, in the v boundary region specifications, directs the system to exclude the corner points because they have already been included with the S boundaries. the system, by default, treats regions as Closed, i.e. inclusive of all their boundary parts. To avoid ambiguities, the corners in two dimensions and edges and vertices in three dimensions, etc., should not have more than one boundary condition assigned them. Using the Open and Closed qualifiers, one can specify a distinct equation on each face, edge, vertex, etc.

In order to solve the linear system resulting from the discretization of the PDE of interest, specify a pre-conditioned conjugate gradient solver PCG, with a symmetric successive over-relaxation SSOR reconditioner. The conjugate gradient solver converges much faster than SOR. However, SOR may be effective as a pre-conditioner depending on the parameters of the equation. To preserve the symmetry properties of the matrix, specify its symmetric form SSOR. Program synthesis makes experimentation with different combinations of solvers and preconditioners easy.

In FIG. 9(a)) shows the present option Δ as a function of S and v for a European call using Heston's stochastic volatility model, while (b) shows ence (x 10") between finite difference and Heston's analytic results for final option value (solid curve) and, for comparison, the difference between finite difference and Black-Scholes constant volatility final option value. In both cases the option values shown are for a variance of v=0.19^2. Other parameters used: iMax=100, jMax=100, K=1., kappa=2., lambda=0., nMax=40, r=0.05, rho=0.5, sigma=0.1, Smax=3., theta=0.04, vMax=0.36, vMin=0.0001.

Figure 9:
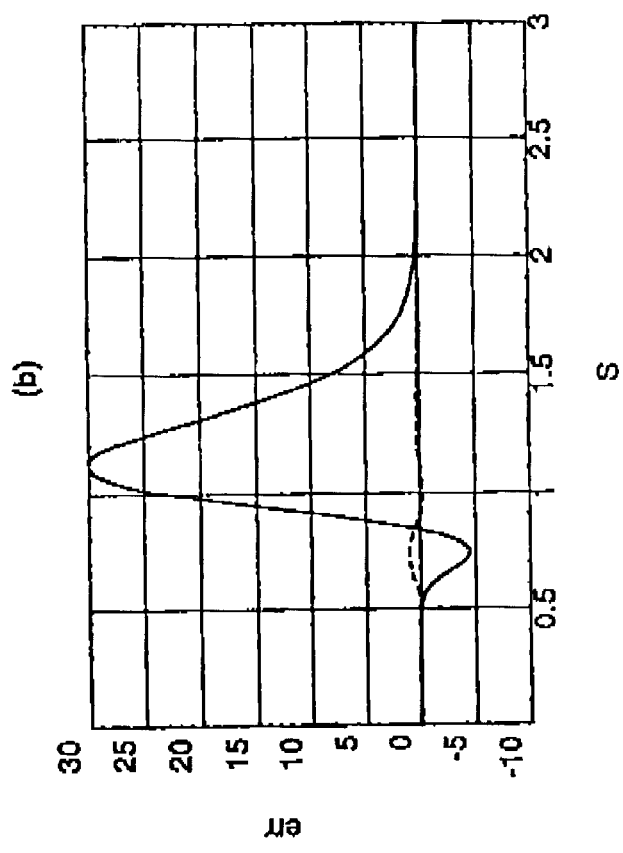
FIG. 9 presents two graphs that depict functions related to the European call using Heston's Stochastic volatility model.
Figure 9:
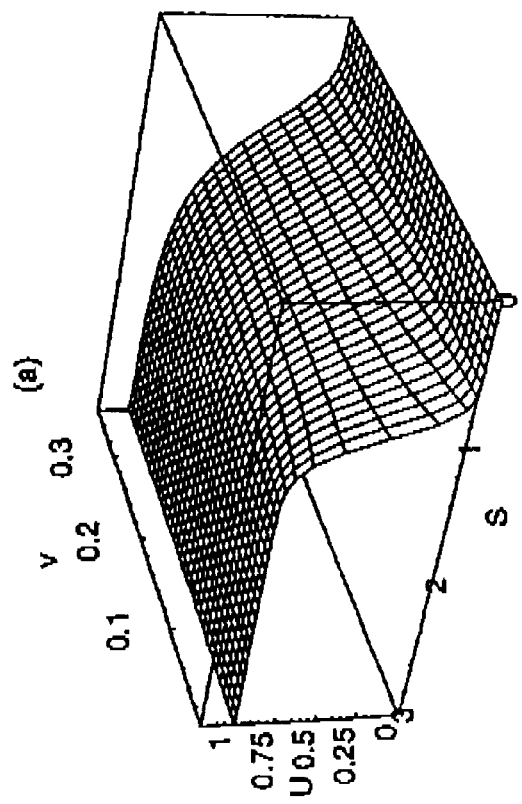
Figure 10:
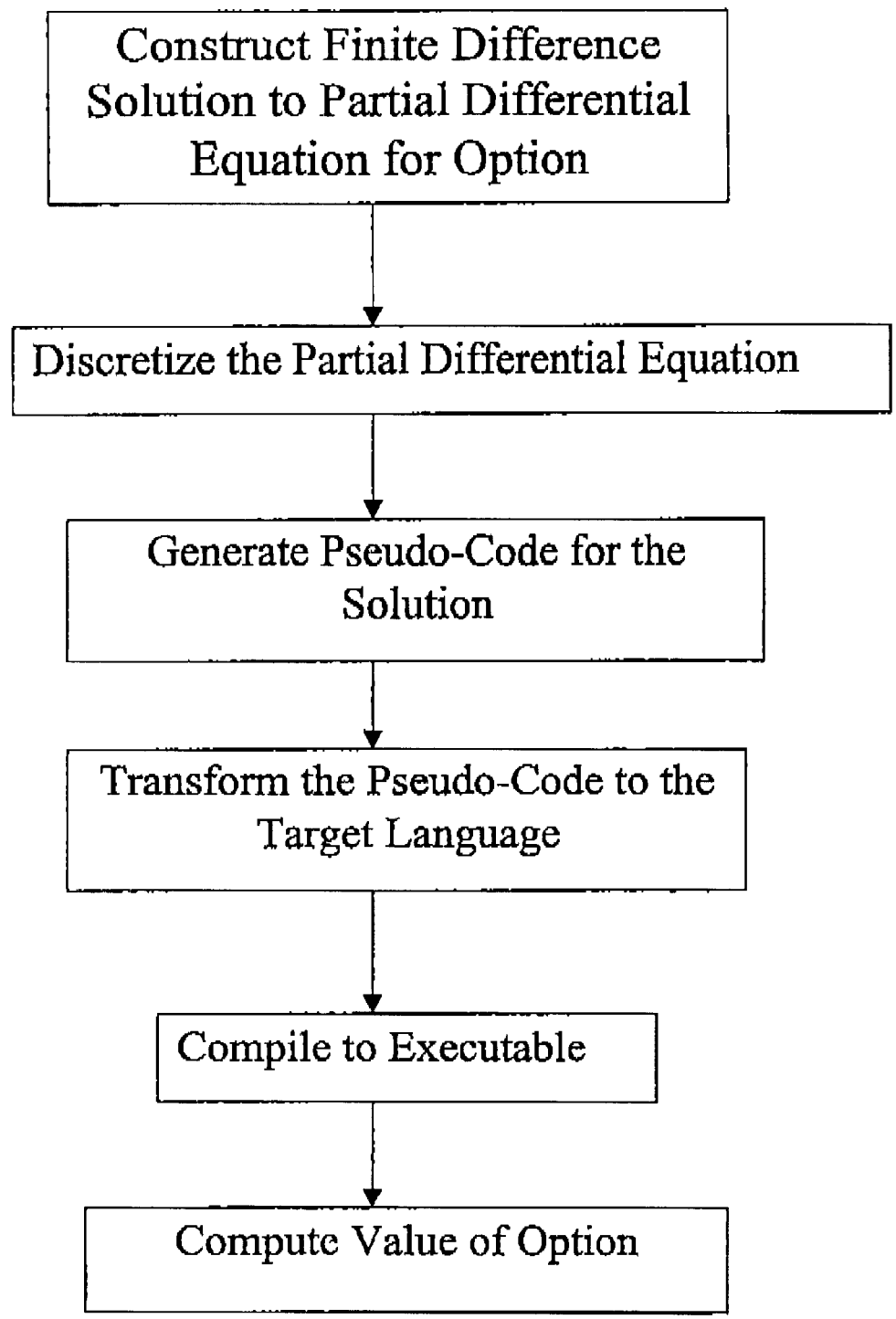
FIG. 10 is a flow chart depicting an option valuation method.

FIG. 9 shows the present Δ of the European call calculated by the finite difference code. The correlation between spot price and variance is P=−0.5, As expected, the gradients of Δ are quite steep (Γ ris large) at low variances while they are smooth at high variances. FIG. 8B shows the difference between the finite difference present option values and Heston's analytic results, and between the finite difference and the constant volatility Black-Scholes analytic result as a function of spot price S. The values shown are for a variance of v=0.19^2. The finite difference and analytic values differ by approximately one basis point, while the finite difference and constant variance Black-Scholes values differ by more than thirty basis points. FIG. 10 illustrates a method in accordance with the present invention for valuing financial instruments.

Monte Carlo Methods

The methods discussed above can be used to cover Monte Carlo simulations by extending the generation of PDE methods to the related generation of SDE (stochastic differential equation) methods. Because of the similarities between specifications and solution techniques, the extensions can be easily made without significant modifications in most cases.

Monte Carlo methods, also known within the financial industry simply as 'simulation' methods, are commonly used to estimate the fair price and hedging characteristics of many types of derivative securities. Although generally not as efficient in terms of computation time (for a given accuracy) as PDE methods, Monte Carlo methods are nonetheless indispensible for problems that are inaccessible to PDE methods. Monte Carlo techniques have been used in the financial industry to price options. See, *Monte Carlo, Methodologies and Applications for Pricing and Risk Mangagment*, Bruno Dupire ed., Risk Publications 1998 (incorporated by reference).

Central Limit Theorem

The core principle of the Monte Carlo method is the central limit theorem (CLT), which establishes how the emperical average of random samples converge to the true expectation. The (CLT) states that the error is asymptotically Gaussian, with a standard deviation of the order of one over the square root of the number of samples, which is the crucial point in the convergence analysis. The Gaussian shape comes from the fact that the law of a sum is obtained by convolution from the laws of the components. In the case of the average, taking the Fourier transform and performing a Taylor expansion before exponentiating gives a Gaussian characteristic function, hence a Gaussian law. The magnitude of the standard deviation comes from the fact that the variance of independent random variables adds up (which is similar to Pythagoras' theorem, which tells us that the squares of the length of the orthogonal sides add up). Thus, the variance of the average of N samples is the individual variance divided by N, and the standard deviation is divided by the square root of n.

Variance Reduction

The irritating slowness of the Monte Carlo method (100 times as much effort to gain a mere decimal place in accuracy) has motivated the development of many ingenious improvements. Most of these consist of reducing the variance, which, in turn, determines the accuracy of the computation. The most common variance reduction techniques are: Antithetic Sampling, Moment Matching/Calibration, Control Variate, Importance Sampling and Stratification/Latin Hypercube.

Error Estimates

The central limit theorem states that the Monte Carlo estimate of the expectation of a random variable is approximately normally distributed. The mean is the proper expectation and the variance is the variance of the random variable divided by the number of samples. A Monte Carlo simulation provides a number whose significance relies on confidence intervals, it is necessary to estimate the variance itself, which can be performed by the Monte Carlo simulation. The expectation is estimated as the empirical average of the draws, while the variance is estimated as the expectation of the square minus the square of the expectation, which merely requires one to take the square of the samples.

Another possibility is to partition the set of draws into p equal subsets. The standard deviation of the p mean is the square roof of p multiplied by the standard deviation of the Monte Carlo estimate.

Discretisation

A major application of Monte Carlo simulation is stochastic process path generation. The perfect simulation would generate every possible path and each path would be defined for all possible dates. Unfortunately, machines are confined to finiteness and two discretisations need to be performed. The first of these is a discretisation in time, where the continuous time line is replaced by a finite set of points on which the process is simulated. This is the time approximation error. The second is a discretisation in the space of all possible events, where there is an expectation overall the possible paths. This is defined as a sampling error.

Discretisation in time stems from the impossibility of computing a process path for every possible path value of the time variable. As a result, each path is defined as on a finite number of dates, usually regularly spaced. For instance, this makes stochastic differential equation (SDE) path generation difficult. Such a SDE path is defined from a Brownian path by twisting it—the drift co-efficient shifts the path and the volatility coefficient dilates its variations. Perfect knowledge of the continuous-time Brownian path entails perfect knowledge of the continuous SDE path. However, this is no longer the case when the Brownian path is only known at a finite number of dates. This is the problem of the pathwise approximation of the SDE, as opposed to the approximation in law. The classical construction of an SDE path is performed by a first-order scheme (called the Euler scheme), which assumes that the coefficients of the SDE remain constant over the time step. More precise schemes exist—such as the second-order Milstein scheme, which anticipates the spot dependency of the coefficients.

The discretisation of space of events, or sampling, is the essence of the Monte Carlo method. Improvements on the standard Monte Carlo method are numerous, with some of them being reviewed earlier in this introduction.

American Monte Carlo

Two main methods dominate the universe of pricing. The first is the partial differential equations (PDE), approach, which can be implemented in a variety of ways (finite difference, finite elements, trees) and can be adopted to take into account early exercise. The second is Monte Carlo simulation, which easily handles path-dependence and high dimensionality.

The PDE approach cannot deal with path dependence in its most general form, although in many applications path-dependence is captured by a single additional state value variable, such as the average of the maximum. The cost of path-dependence is that it increases the dimension of the PDE, which cannot realistically be more than three or four preventing its use for multi-asset instrument pricing.

Monte Carlo methods have no problem in dealing with high dimension, but they are not designed to handle early exercise. A standard Monte Carl simulation generates final payouts independently and combines them in a linear fashion, while early exercise requires knowledge of the option value at intermediate dates and performs non-linear operations along the way. However, recent years have seen the increasing application of the twists in Monte Carlo simulation in order to endow them with this capability.

The core of American option pricing is dynamic programming, which requires the ability compute the live value of the option at any time in order to decide whether it is preferable to exercise it or to hold it. The live value is discounted expectation one step ahead.

In a standard Monte Carlo simulation, each path is generated independently and the option value is known at only two dates; at the end, conditional on the path that has been followed, and at the beginning, by taking the discounted average of the final values. To compute the value at an intermediate dates requires structuring the simulation in a manner which makes it a sort of hybrid between a Monte Carlo approach and a tree. It involves creating links between different paths, and various path-bundling schemes have been investigated.

Low Discrepancy

The superiority of the Monte Carlo method over classical numerical integration schemes comes from the difficulty of evenly populating a high-dimensional space. High dimensionality is not only a challenge of the intuition, it also poses increasingly different problems. For instance, in high dimension most of the volume of a ball is a close to the edge, and the volume of a hyper-cube of length ½ vanishes to 0 when the dimension increases, which suggests that the unit ball is compact in finite dimension but not in infinite dimension. This may appear to e a mere topological curiosity, but in infinite dimension you can lodge an infinite number of non-intersecting hypercubes of length ½ in hypercube of length 1, and any finite sequence of points will leave an infinite number of small hyber-cubes untouched. This explains why, on the way to infinite dimension, it becomes increasingly difficult to fill volumes. Most common numerical schemes are based on Taylor expansions and requires that the diameter of the area controlled by a point is small, which in turn requires an exponential number of integration points. Monte Carlo methods are immune this "curse of dimensionality" as their order of convergence does not depend on the dimension, although the random points may gather in some regions and ignore some others (which explains the poor order of convergence).

Recently, remarkable advances have been accomplished in improving deterministic integration through the development of low-discrepancy sequences. The discrepancy of a sequence is measures its maximum discrepancy from uniformity. Many low-discrepancy sequences have been developed, most of them based a p-adic digit manipulation. It is possible to conduct an error analysis—thanks to a result known as the Koksma-Hlawak inequality, which states that the integration error on a function is less than a discrepancy multiplied by the variance of the function. The discrepancy measures the maximum integration error on products of interval-characteristic functions, and the variation of a function measures its approximately by a combination of such functions. Low-discrepancy sequences performs impressively in low dimensions, but their effectiveness in high dimensions is highly debatable. First, it is virtually impossible to compute the variation of a function in high dimension; and it may be very big (if the function is not smooth enough, its variation may be infinite). Second, although the theoretical convergence order of the good low-discrepancy is almost 1, it seems it is attained only after a very long cycle has been completed. In some ways, even low-discrepancy sequences are virtually caught up by the curse of dimensionality.

Adaptive Methods

When Monte Carlo samples are generated, even if we do not know them in advance because of their random nature, at the end of the day they are still just a given set of scenarios. It is natural to wonder whether this set could have been "improved" in some sense. We can give a more formal meaning, for instance gauging the quality of a set of points by their ability to price correctly a class of function. That is essentially what low-discrepancy sequences do, as the discrepancy is the maximum error on multi-dimensionality digital functions. Other functions can be made such as the requirement that European options have to be correctly priced, or to demand—in the case of path generations—that important asset value statistics such as final, average, maximum and minimum values are well sampled. In these cases, the point positions can be optimized to fit the chosen criteria.

Another approach is to make use of the knowledge of the function to be priced. For example, singularities and high-gradiant (or high-convexity) zones should be more finitely samples. As we have seen with importance sampling, over-sampling needs to be compensated by renormalising the function; or; equivalently; by attaching smaller-probability weights to the samples of the over-represented regions.

Another method which makes use of no-uniform weights in numerical integration, which estimates an integral as a linear combination of point values. It is tempting to take advantage of the freedom of choice of both the point positions and of the weights; however, it is quite impractical in high dimension. As an example, it seems to be a good idea to assign to each sample a weight equal to the volume of the region it controls, defined as the set of points closer to this sample defined as the set of points closer to this sample than to any other sample. In dimension 1, this weighted Monte Carlo scheme has an improved order of convergence of one. However, it does not extend to higher dimension, and the computation of the region (known as Delauney tesselation) volumes is very involved.

Malliavin Calculus

A path-dependent option gives, by definition, a payout which depends on the realized path. If this path has been generated by discretising an SDE, it is characteristic by n Gaussian increments and the option price is an expectation under a Gaussian probability in dimension n. It can be written as an n-dimensional integral of the payout multiplied by the Gaussian density, which can be integrated by parts—which leads to uncommon interpretations. Two interesting examples, can be given to illustrate this approach, termed Malliavin calculus (which was developed in the late 1970's and applied to finance in the late 1990's). The first of these is Greeks computation, in which calculations are made along each original path without having to shift then. For instance, the delta of an option can be compared by multiplying the final payout by a certain quantity, as opposed to differentiating it, which gives the smoother estimates for the Greeks. The second example is the computation of conditional expectations, where the integration is by part transforms the Dirac function into a Heaviside function. This allows conditioning by a given asset price be transformed by being above that asset price.

Generation of Code

PDE methods generally become impractical as the number of underlying assets becomes greater that 3 to 4. For example, consider a basket option on 10 airline stocks. Such an option, which pays at expiration the positive difference between the weighted sum of the future prices of the 10 stocks and a predetermined strike price, are quite common. Pricing this option using a PDE approach, would require a 10-dimensional grid to be stored in the computer. Since each dimension of the grid might require 100 grid points, this problem completely impractical.

However, the problem is easily done with a Monte Carlo technique, which requires no grid. Instead, a large number of possible future prices for the stocks, perhaps thousands or millions, are calculated using a model for the evolution of the stock prices, including both deterministic and random components. Then the payoffs of the option for all of the simulated stock paths are averaged together, and this payoff is discounted back to present value using a model of interest rates. The discounted average payoff is the fair value of the option. Sometimes, just the final price of the stocks are needed. These are called path independent options. Sometimes the entire history of the stock price evolution (the paths) are required. These are called path-dependent options. The key is that the simulated stock paths are independent, so that they may be discarded after contributing to the payoff average. Hence computer memory requirements, even for problems of very large dimensionality are still reasonable.

Monte Carlo techniques are also used in cases where the stock price dynamics are very complex. For example a stock price may be modeled as depending on several stochastic or random processes. There may be one or more diffusion components which are continuous in time, and there may be additional discontinuous or 'jump' components. The frequency and distribution of jumps may have complex statistical distributions. Complex stock price dynamics models such as this may be difficult to cast into PDE form, or if done, may be of too high a dimensionality to be practical, each random component typically giving rise to a new dimension.

Problems based on Monte Carlo methods can be specified similarly to problems based on PDE methods, except that a set of SDEs (stochastic differential equations) is specified instead of a set of PDEs. The discretization methods needed overlap with the PDE methods but require some additional techniques. Similarly, the solution methods can be specified by a combination of equations to solve and new templates representing solution methods. Some of the PDE-based existing data structure representations are used, but a few new ones are added.

SDEs can actually be converted to PDEs by a well-known mathematical technique, so a specification in terms of SDEs enables the generation of either programs with PDE-based solutions or programs with SDE-based solutions. Such mathematical techniques include:

After conversion of the SDEs to PDEs, the previously discussed methods allow the generation of code.

While the use of the above discussed methods have been illustrated in the context of modeling financial instruments, other applications are possible. Such applications include:

1) Design of nuclear reactors and neutron or X-ray radiation shielding.
2) Dosimetry calculations for medical radiation treatments, via neutron beam, electron beam, X-ray, or gamma ray, etc.
3) Simulation of protein and peptide structure and folding in 3D.
4) Particle deposition modeling for electronic processing, i.e., wafer fabrication
5) Electronic transport in in semiconductors.
6) Pollutant migration in the atmosphere.
7) Transportation system modeling.
8) Business decision making, so-called "real options" valuation, e.g., probable return and distribution of returns on building a new refinery.

What is claimed is:

1. A method for automatically generating software code in a target language for modeling and valuing financial instruments, comprising the steps of:
    a) developing a problem specification for the financial instrument including—defining the financial instrument as problem specification, comparing said problem specification with constraints within a knowledge base, invoking heuristics within said knowledge base to further define said problem specification;
    b) formulating a financial model of the problem specification, including—producing one or more templates associated with a Monte Carlo Simulation describing said financial model;
    c) generating software code in said target language based on said templates; and
    d) running said software code on a computer with user-defined variables to value said financial instrument.

2. The method of claim 1, said invoking heuristics substep comprising using the heuristics within said knowledge base unless in conflict with said problem specification.

3. The method of claim 1, said template also expressing procedural control structures and data declarations.

4. The method of claim 1, said knowledge base including a number of templates arranged as a hierarchy of classes.

5. The method of claim 4, said template classes including solvers, time evolution, interpolation routines, optimization routines, and time-stepping algorithms, singular value decomposition routines, pseudo-random and quasi-random number generation routines, routines for generation of samples from various statistical distributions, Brownian Bridge path generation routines, Latin hypercube sampling routines, single and multi-variate regression and back-substitution routines.

6. The method of claim 1, said developing step (a) including comparing the problem specification with heuristics within said knowledge base to determine if the problem specification is complete.

7. The method of claim 6, said developing step (a) including invoking user feedback if the problem specification is incomplete and if a constraint is violated.

8. The method of claim 1, said formulating step (b) including specifying an evolution algorithm in an evolution template.

9. The method of claim 8, said evolution template comprising a fixed time step.

10. The method of claim 8, said evolution template comprising a variable time step.

11. The method of claim 8, said evolution template comprising a time discretization.

12. The method of claim 1, said generating step (c) includes developing a data structure using said problem specification and said template, and generating pseudo-code describing said user problem using said template and data structure.

13. The method of claim 12, including translating said pseudo-code into executable software code in said target language.

14. A system for valuing a financial instrument which automatically generates software code based on a user-defined specification of said financial instrument, comprising:

a knowledge base containing constraints, heuristics and defaults for developing a finance problem specification based on said user-defined specification and said constraints, heuristics and defaults;

a computer algebra system for writing at least discrete portions of a Monte Carlo Simulation indicative of said finance problem specification;

one or more templates describing said stochastic differential equations, describing evolution of said stochastic differential equations, and generating pseudo-code reflecting said Monte Carlo Simulation; and a code generator which generates software code in a target language from said pseudo-code for valuing a financial instrument based on said user-defined specification.

15. A method for modeling a finance problem useful for valuing financial instruments associated with the problem, comprising the steps of:

assembling a set of algorithm templates some of which represent a Monte Carlo Simulation describing the finance problem,
the templates being human readable declarations of said Monte Carlo Simulation independent of data structure and target language specifics,
one or more of said templates including pseudo-code expressions including matrix operators, scalar operators, or Boolean operators;

filling in the problem attributes in said templates including invoking a knowledge base having constraints, heuristics, and defaults to refine design decisions of the finance problem; and building pseudo-code from said templates which models said finance problem.

16. The method of claim 15, each template being represented as a class in a hierarchy of template classes in a knowledge base.

17. The method of claim 15, names for variables and place-holders in a template being drawn from other templates.

18. The method of claim 15, said constraints comprising requirements for the finance problem.

19. The method of claim 15, said heuristics comprising suggestions for the finance problem.

20. The method of claim 15, said defaults comprising problem attributes used for the finance problem in the absence of user definitions or heuristics.

* * * * *